United States Patent
Jafri

(10) Patent No.: US 11,481,696 B2
(45) Date of Patent: *Oct. 25, 2022

(54) TRAVEL DISTRIBUTION SYSTEM

(71) Applicant: Onriva, Inc., Foster City, CA (US)

(72) Inventor: Vajid Jafri, Redwood Shores, CA (US)

(73) Assignee: Onriva LLC, Foster City, CA (US)

( * ) Notice: Subject to any disclaimer, the term of this patent is extended or adjusted under 35 U.S.C. 154(b) by 151 days.

This patent is subject to a terminal disclaimer.

(21) Appl. No.: 16/543,420

(22) Filed: Aug. 16, 2019

(65) Prior Publication Data

US 2019/0378058 A1  Dec. 12, 2019

Related U.S. Application Data

(63) Continuation of application No. 15/192,775, filed on Jun. 24, 2016, now Pat. No. 10,445,665.

(60) Provisional application No. 62/184,220, filed on Jun. 24, 2015, provisional application No. 62/204,977, filed on Aug. 14, 2015.

(51) Int. Cl.
*G06F 16/20* (2019.01)
*G06Q 10/02* (2012.01)
*H04L 67/02* (2022.01)
*H04L 67/306* (2022.01)
*G06Q 30/02* (2012.01)
*G06Q 50/14* (2012.01)

(52) U.S. Cl.
CPC ......... *G06Q 10/02* (2013.01); *G06Q 30/0207* (2013.01); *H04L 67/02* (2013.01); *H04L 67/306* (2013.01); *G06Q 50/14* (2013.01)

(58) Field of Classification Search
CPC .... G06Q 10/02; G06Q 50/14; G06Q 30/0207; H04L 67/306; H04L 67/02
See application file for complete search history.

(56) References Cited

U.S. PATENT DOCUMENTS

| | | | |
|---|---|---|---|
| 6,839,679 | B1 | 1/2005 | Lynch et al. |
| 7,979,457 | B1* | 7/2011 | Garman ............. G06Q 30/0625 707/768 |
| 8,005,685 | B1 | 8/2011 | Bird |
| 9,633,402 | B1 | 4/2017 | McCartney |
| 2001/0053989 | A1 | 12/2001 | Keller et al. |
| 2003/0144867 | A1 | 7/2003 | Campbell et al. |
| 2008/0249895 | A1 | 10/2008 | Mariotti |
| 2008/0256036 | A1 | 10/2008 | Falk et al. |
| 2010/0131553 | A1 | 5/2010 | Chaumont et al. |
| 2013/0024404 | A1 | 1/2013 | Zacharia et al. |
| 2013/0073323 | A1 | 3/2013 | Zacharia et al. |
| 2015/0332176 | A1 | 11/2015 | Shaw |
| 2016/0203422 | A1 | 7/2016 | Demarchi et al. |
| 2016/0300161 | A1* | 10/2016 | Montegut ............. G06Q 50/14 |

(Continued)

OTHER PUBLICATIONS

Resolution 787 enhanced Airline Distribution (Year: 2013).*

(Continued)

*Primary Examiner* — Tarek Chbouki
(74) *Attorney, Agent, or Firm* — Fenwick & West LLP

(57) ABSTRACT

A travel distribution system can include searching for flights for airlines using new distribution capability (NDC) standards, global distribution system (GDS) network, or using Application program interface (API) or websites. Artificial intelligence can also be used to assist the search for best matching a customer's travel preference profile.

20 Claims, 12 Drawing Sheets

(56) References Cited

U.S. PATENT DOCUMENTS

| | | | |
|---|---|---|---|
| 2016/0378874 A1 | 12/2016 | Jafri | |
| 2017/0004590 A1 | 1/2017 | Gluhovsky et al. | |
| 2017/0046732 A1 | 2/2017 | Elmachtoub et al. | |
| 2017/0154353 A1 | 6/2017 | Ralston | |
| 2017/0178259 A1 | 6/2017 | Goldstein | |
| 2018/0032581 A1 | 2/2018 | Baldeschi et al. | |

OTHER PUBLICATIONS

Iata, "Business Requirements Document: NDC1: Airline Shopping," Oct. 23, 2013, pp. 4, 7, 12, 19-10, 40-42 [Retrieved on Feb. 25, 2020] Retrieved from the Internet <URL https://web.archive.org/web/20140716022609/http://www.iata.org/whatwedo/airline-distribution/ndc/Documents/ndc-shopping-brdv179-release.pdf>.

Jones, N., "A tutorial on lookup tables in C," Embedded Gurus, Jan. 11, 2010, 19 Pages, [Retrieved on Feb. 25, 2020] Retrieved from the Internet <URL: https://embeddedgurus.com/stack-overflow/2010/01/a-tutorial-on-lookup-tables-in-c/>.

Southwest Airlines, "EarlyBird Check-In," Feb. 24, 2013, 1 Page [Retrieved on Feb. 26, 2020] Retrieved from the Internet <URL: https://web.archive.org/web/20130224191700/http://www.southwest.com/html/generated/help/faqs/earlybird_checkin_faq/html>.

De Santis, G., "Which Future for the Airline Distribution?" LUISS, Sep. 30, 2013, pp. 1-100.

PCT International Search Report and Written Opinion for PCT/US2016/039387, dated Sep. 19, 2016, 13 Pages.

Tnooz Reports, "The real NOC: Decodinlthe planned (r)evolution in airline distribution by IATA and airline," Jan. 17, 2013, 21 Pages, [retrieved on Aug. 21, 2016] Retrieved from the Internet <URL: https://www.tnooz.com/arflcle/the-real-ndc-decoding-the-planned-revolution-in-airline-distribution-by-iata-and-airlines/>.

WNS Holdings, "New Distribution Capability for Airlines: Preparing for Take-Off," Jun. 2, 2015, pp. 1-4.

\* cited by examiner

```
Price . . . . . . . . . . . . . . . . . . . . . . . . . . . 7

. . . . . . .

Priority boarding . . . . . . . . . . . . . . . . . 2

. . . . . . .

Layover time . . . . . . . . . . . . . . . F(time)

TRAVEL DISTRIBUTION SYSTEM

CROSS REFERENCE TO RELATED APPLICATIONS

This application is a continuation of U.S. patent application Ser. No. 15/192,775, filed Jun. 24, 2016, which claims the benefit of U.S. Provisional Application No. 62/184,220, filed Jun. 24, 2015, and U.S. Provisional Application No. 62/204,977, filed Aug. 14, 2015, each of which is incorporated by reference in its entirety.

BACKGROUND

Each airline has its own reservation system, which is a computerized system for storing and retrieving information and for conducting transactions related to air travel. With the advances of internet network, the airline reservation systems have been tailored to meet the customer demands, exemplified by the airline websites, in which a customer can make reservation, purchase ticket, plan traveling trips, together with selecting other features such as upgrading, more leg room, redeeming frequent flyer miles, rebooking canceled flight, selecting seats, purchasing day club passes, priority boarding, and others.

In addition to their own reservation systems, airlines also use a global distribution system (GDS), which is a network operated by a company that allows automated transactions with multiple airlines. Primary customers of GDS are travel agents, who can make travel booking on various reservations systems run by the airlines. For example, when a travel agency, through GDS, requests a reservation on a particular airline, GDS routes the request to the appropriate airline computer reservations system for seat availability information. Other information such as fares and flight schedules are provided to GDS from third party databases. This can allow a travel agent with a connection to a GDS to compare, choose and book various flight activities on all the airlines that are part of that GDS.

FIG. 1 illustrates a schematic of GDS operation according to some embodiments. A GDS system can connect to a schedule database, maintained by a third party, for flight schedules between two cities. The GDS system can connect to multiple airlines for accessing seat availability for the flight schedules. The GDS system can also connect to a fare database, maintained by another third party, for fare information regarding the flight schedules. Travel agencies can then connect to GDS for searching for flight schedules, seat availability, and fares.

There can be drawbacks with GDS. For example, there can be cost for the airlines associated with transactions booked through GDS, even though the transactions may ultimately be canceled. Thus low cost airlines typically do not participate in GDS, and prefer maintaining their own website as the primary distribution channel with cheapest fares. Further, GDS uses a less flexible pre-Internet message protocol, for example, getting seat availability information directly from airlines, while getting flight schedule and fare information from third party databases. Thus added values presented by the airlines cannot be presented through GDS effectively and attractively.

Thus there is a need for improving the airline distribution system.

SUMMARY

In some embodiments, a travel distribution system can include searching for flights for airlines using new distribution capability (NDC) standards, using application program interface (API) or websites of the airlines, and global distribution system (GDS) network. The search using different protocols can find complete flights from multiple airlines.

In some embodiments, the search can be first performed for airlines using new distribution capability (NDC) standards, followed by airlines using application program interface (API) or websites of the airlines, and then followed by airlines using global distribution system (GDS) network. The order can provide better flight amenities, e.g., new programs or features of the airlines that are offered to the customer.

In some embodiments, seamless migration can be provided, for example, to allow ease of transition when an airline migrates from one protocol to another protocol. A list of airlines with appropriate protocols can be maintained, and consulted before searching. A seamless transition can be accomplished by updating the list of airlines with protocol characteristics.

In some embodiments, ease of use for the customer can be provided, for example, to allow a customer familiar with GDS display format to use the content rich offerings of NDC format. A display profile can be used for the customer to select a desired display, such as a GDS-style display or an NDC-style display. A transition can be performed, in which the display can be gradually changed, for example, from GDS to NDC-style, thus allowing the customer to use the content-rich of NDC standards.

Artificial intelligence can also be used to assist the search for best matching a customer's travel preference profile. A customer can asked to assist in updating a preference profile, so that better flight selection can be achieved.

BRIEF DESCRIPTION OF THE DRAWINGS

FIG. 10 illustrates a configuration of a travel profile according to some embodiments.

Figure 1:
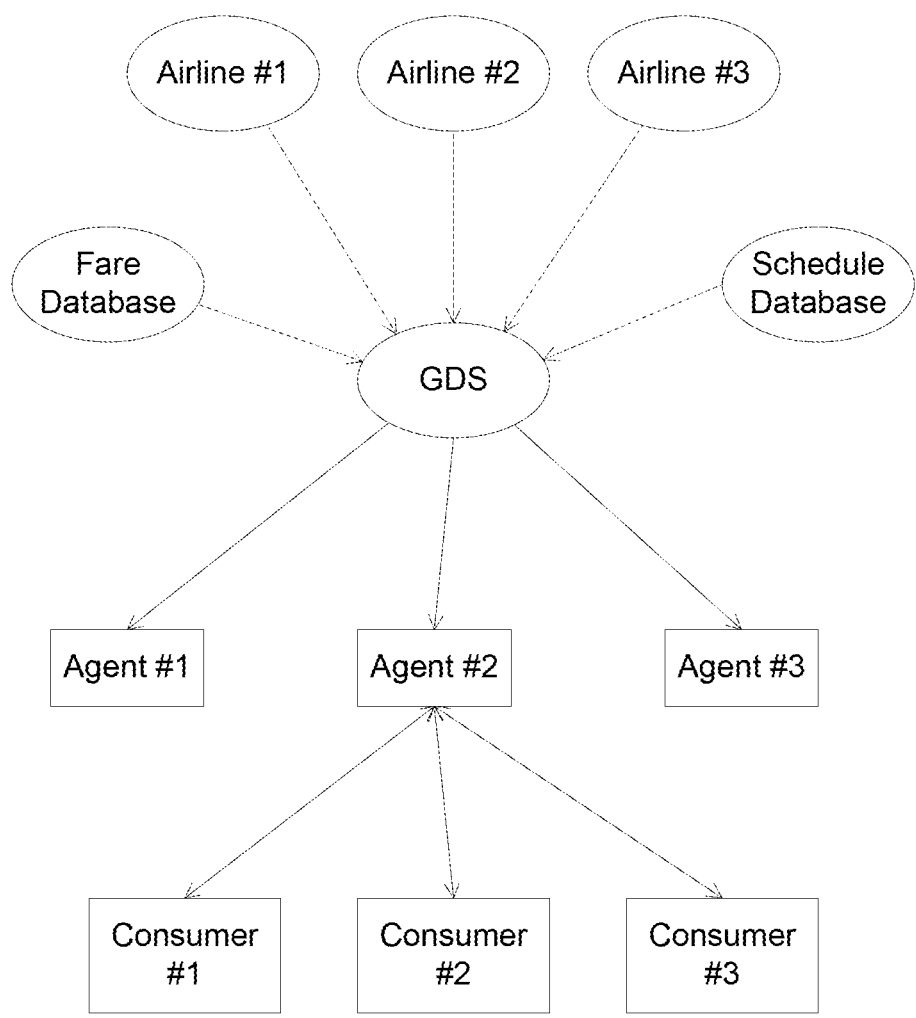
FIG. 1 illustrates a schematic of GDS operation according to some embodiments.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

In some embodiments, the present invention discloses methods, and systems employing the methods, to provide a travel distribution system to meet the needs of a customer. The travel distribution system can search through multiple airlines to find flights most suitable to the customer. The suitable flights should meet the customer preferences, including amenities such as flight convenience and comfort, using algorithms to compare the flight characteristics and amenities with a customer profile. The profile can also be updated, such as based on actions of the customer.

The travel distribution system can have flexible protocols to efficiently support modern retailing practices such as personalized and customized offers, which can be presented effectively and attractively to the customers. For example, an airline that offers some extra legroom or a priority boarding option can entice the customers with this added value when selling through the travel distribution system.

In some embodiments, the present invention discloses a travel distribution system that allows coupling to multiple airlines, for example, to traditional airlines and to low cost airlines. The coupling of the travel distribution system to multiple airlines can allow the comparison between airlines, so that consumers can choose a travel package that most suits their needs. The selection of travel package can include other amenities, such as early boarding, preferred check in, newer aircraft, and aircraft with more leg room, in addition to the basic information of traveling time and traveling cost.

The present GDS network can be slow to respond to individual airline needs, such as including special promotion programs so that customers can purchase. In addition, not all airlines join GDS network, thus a search through GDS network can miss flight offers from some airlines, such as low cost airlines that maintain their own website distribution service to increase profitability and lower operating expenses.

Airlines have provided websites for consumers, who can have the ability to view rich content, including bundled and special fare offers, as well as other amenities such as free upgrade, extra leg rooms, redeem frequent flier miles, and ability for early check in. Large airlines can maintain their own websites, together with joining GDS network. Thus a travel agency can search the GDS network to find flights for these large airlines. However, certain low cost airlines do not join GDS network, and rely solely on their websites for attracting customers. Thus a travel agency searching for flights in GDS network does not have a complete list of available flights.

Figure 2:
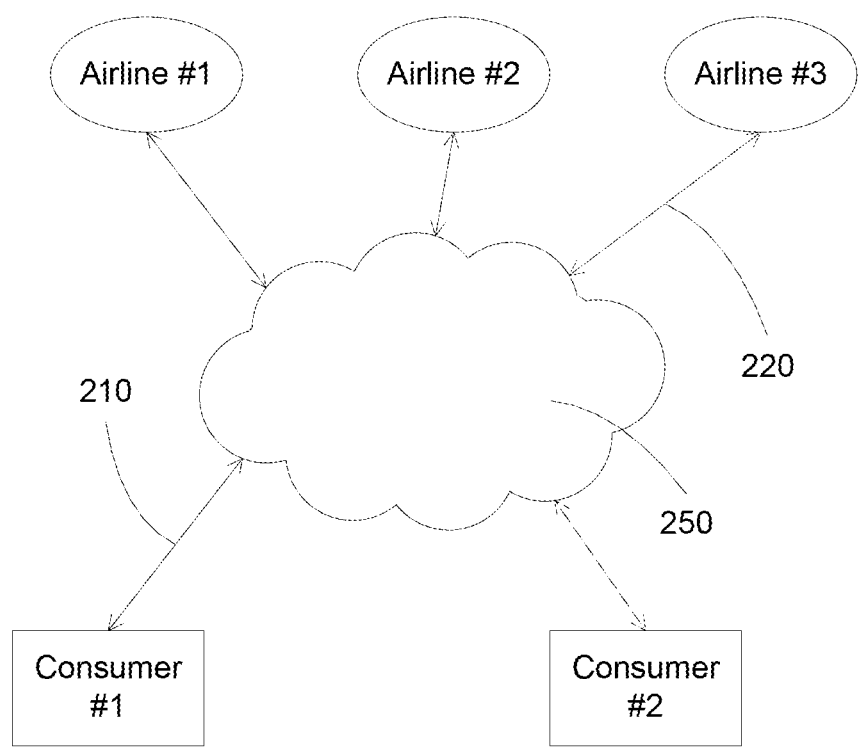
FIG. 2 illustrates a schematic for individual airlines access according to some embodiments.

FIG. 2 illustrates a schematic for individual airlines access according to some embodiments. Airlines can maintain websites linked 220 to the internet 250. A consumer can access 210 individual airlines, for example, through the internet 250 to their websites, for information provided by the airlines. Rich content can be presented at the websites, for example, sale prices, new routes, new planes, etc. The connection can be an internet connection, so the customers can view all information that the airlines provide.

The airline websites are independent of GDS network, so a customer would have to perform multiple searches, e.g., for the airline websites and for the GDS network, and to consolidate the searches to obtain available flight information.

In some embodiments, the present invention discloses a travel distribution system that can include airlines from different networks, such as airlines from GDS network and airlines from internet network. The travel distribution network can have access to most, if not all, airlines that offer air flights, so that a customer can utilize the travel distribution system to obtain a comprehensive and complete list of flight information. For example, multiple airlines can participate in the present travel distribution system, including traditional airlines and low cost airlines. In addition, the present travel distribution system can have access to non-participate airlines, such as from their websites or from their Application Program Interface (API) codes. The presence of multiple airlines can allow a complete shopping comparison, e.g., searching through multiple airlines to find a perfect match for a customer travel plan.

In some embodiments, the present invention discloses a travel distribution system which can include a platform for communicating with airlines through NDC protocols or standards. The platform can also communicate with airlines through other protocols, such as API access or website access, or through a network, such as the GDS network.

In some embodiments, the NDC protocols can have higher priority for airlines, for example, if an airline uses the NDC protocols and also participate in GDS system and/or offer services in web sites, the platform can communicate with the airline through the NDC protocols. NDC protocols can allow a lot more information to be transferred, such as information about new planes with extra legroom, with individual entertainment system, or with on time or safety record. This additional information can assist the consumers in deciding between travel plans offered by different airlines. Thus after the customer provides a desired flight plan, the platform can contact airlines through the NDC protocols to obtain flight schedules, together with additional services offered by the airlines.

In some embodiments, the present travel distribution system can maintain a database for information from airlines using the NDC protocols. Thus the platform can search for flight information through the database, instead of through the individual airlines.

In some embodiments, the present travel distribution system can include the new distribution capability (NDC) data transmission standards, which presents data transmission standards for airlines, and which can use a XML-base data transmission standard to enhance the capability of communications with the airlines. The usage of NDC standards can offer improved services, such as customization and personalization for the customers, for example, better than GDS because of flexible programming. Using the NDC standards, the travel distribution system can provide rich information and airline custom programs to the consumers. For example, airlines can offer a wide variety of products and services, including custom programs, similar to their websites to appeal to the consumers, including early boarding, preferred seating, airline lounge access, lie-flat seats, Wi-Fi on international services, three-for-two pricing from Air New Zealand, and extra leg room and/or extra recline seat selection (e.g., offered in KLM Economy Comfort). Using the NDC standards, the present travel distribution system can provide the same information to the consumers. An advantage of the present travel distribution system is the ability to connect to multiple airlines, e.g., the airlines that accept the NDC standards, thus can aggregate flight information from multiple airlines with a single input from the customer, instead of requiring the customer to contact individual websites of the airlines.

The usage of NDC standards can also provide significant advantages over current GDS, which might not be aware of the full range of airline products on offer, and which cannot provide airline customized offers to the customers. For example, to a GDS, one business class seat looks like any other, e.g., just a code on a screen. The present travel distribution system can offer all services from multiple airlines, so a customer can choose the best travel package. For example, the present travel distribution system can allow airlines to present and manage their product offering through indirect sales channels, such as through travel agents, in the same way as selling through their own websites.

In some embodiments, the present travel distribution system can include communication to the airlines through application programming interface (API) or through websites of the airlines. The API or the websites of the airlines can provide basic reference data about the airlines, thus the travel distribution system can communicate to an airline through the airline API or through the airline websites to access the airline data and services.

The travel distribution system can include an interface or a platform, e.g., the platform for communicating with airlines through NDC standards, for communicating with the airlines through their API or through their websites, for example, through the internet. In some embodiments, the travel system can use the platform to communicate with airlines that do not use NDC standards. Thus after the customer provides a desired flight plan, the platform can search for flight information in the internet, e.g., through airline API or through the individual web sites of airlines that do not use NDC standards.

In some embodiments, the platform can search for flight information from airlines using NDC standards before searching for flight information from airlines through the airline API or websites. Thus for airlines using NDC standards and providing API or websites, the platform can communicate with the airlines using NDC standards, and without the need for communicating through the API or websites.

In some embodiments, the platform can search for flight information from airlines through the airline API or websites before searching for flight information from airlines using NDC standards. Thus for airlines using NDC standards and providing API or websites, the platform can communicate with the airlines using the API or websites, and without the need for communicating using NDC standards.

In some embodiments, the present travel distribution system can include communication to the airlines through a GDS network, such as Amadeus GDS, Sabre GDS, and Travelport GDS. GDS is a network between airlines and travel agents. In the early days of computerized reservations systems a flight ticket reservation is not possible without it. In the computer age, many airlines have started to sell directly to their wholesale and retail customers, such as using API or websites.

The travel distribution system can include an interface or a platform, e.g., the platform for communicating with airlines through NDC standards or through airline API or websites, for communicating with the airlines through a GDS network, for example, for airlines that do not use NDC standards and/or airlines do not offer API or websites.

In some embodiments, the platform can last search for flight information from airlines through a GDS network, since using NDC standards or airline API or websites can offer richer content than using a GDS network. For example, the platform can first search for flight information from airlines using NDC standards, followed by searching for flight information from airlines through the airline API or websites, and followed by searching for flight information from airlines through a GDS network. Alternatively, the platform can first search for flight information from airlines through the airline API or websites, followed by searching for flight information from airlines using NDC standards, and followed by searching for flight information from airlines through a GDS network. Thus for airlines using NDC standards and participating in GDS, the platform can communicate with the airlines using NDC standards, and without the need for communicating through a GDS network. Similarly, for airlines providing API or websites, the platform can communicate with the airlines through the API or websites, and without the need for communicating through a GDS network.

The travel distribution system can be configured to work with the advantages and disadvantages of different protocols. For airlines participating in new distribution capability (NDC) standards, the present travel distribution system can obtain all the data that the airlines offer, such as information related to benefits of the flight, such as more legroom due to newer planes, individual entertainment systems at every seat (instead of a central entertainment system), priority boarding, and information on luggage. Thus the customer can have more data to compare and select appropriate airlines and flight services offered by the airlines. The present travel distribution system can also work with GDS and with airlines having individual web sites, thus can provide a complete selection of flight schedules from different airlines.

In some embodiments, the present travel distribution system can allow comparison-shopping, for example, by sending out multiple shopping requests simultaneously to multiple airlines. The shopping requests can include a travel plan, such as an origin travel city and a destination city. The requests can include various preferences of the customers, which some airlines may be able to satisfy better than others. In some cases, the requests can be an optional request, e.g., the preferences are optional, and can be presented by different airlines at different levels of meeting the preferences. In some cases, the requests can be an integrated request, e.g., the preferences are as important as the flight schedule, and thus airlines that can't meet the preferences may not respond. Thus the present travel distribution system can provide shopping comparisons involving more than price and flight schedule.

In some embodiments, the present travel distribution system can be provided with no extra cost to airlines. For example, the present travel distribution system can be free to the airlines, thus enticing low cost airlines to participate. Alternatively, the present travel distribution system can add a fee for rendered services, but only when the airlines are benefited, such as when a ticket is sold.

In some embodiments, the present invention discloses a travel distribution system that can respond to customer requests in real time. The present travel distribution system can allow rich content to flow from the airline suppliers to the consumer, including fares, schedules, seat descriptions, airport lounge offering, baggage information, frequent flier miles status and ability to use frequent flier miles to purchase tickets or upgrade to a higher class of service, priority boarding, free limo service, free hotel for overnight connections, and others. The present travel distribution system can also allow rich content to flow from the consumers to the airline suppliers, including frequent flier information, demographic information, price sensitivity calculated by algorithms, recommended sale price, recommended perks that could help make a sale, and others.

Figure 3A:
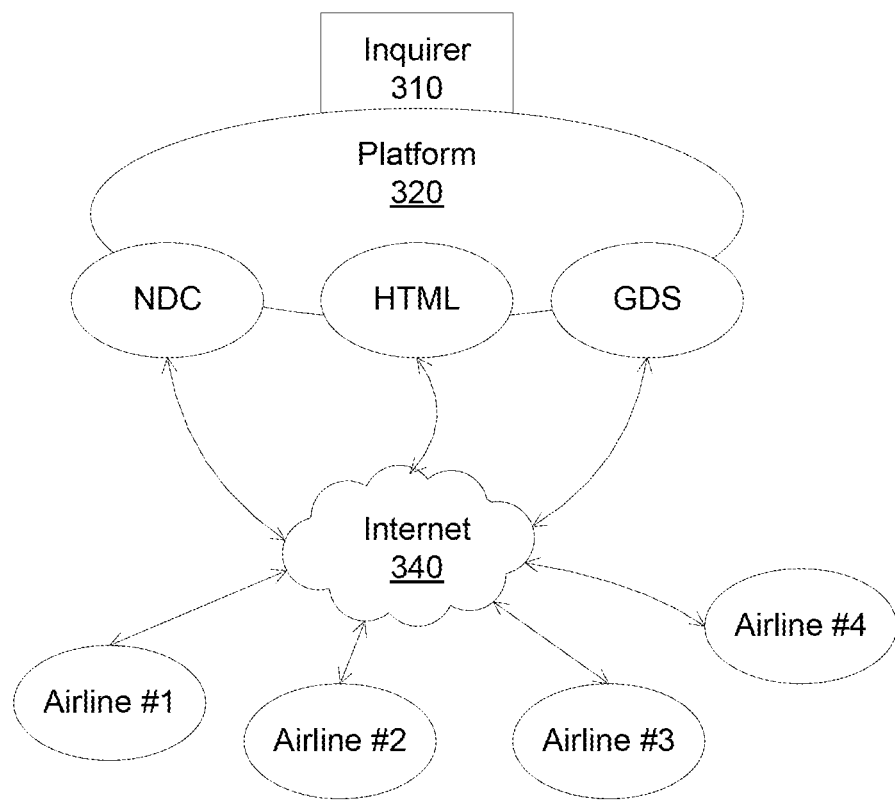
FIGS. 3A and 3B illustrate configurations of travel distribution systems according to some embodiments.
Figure 3B:
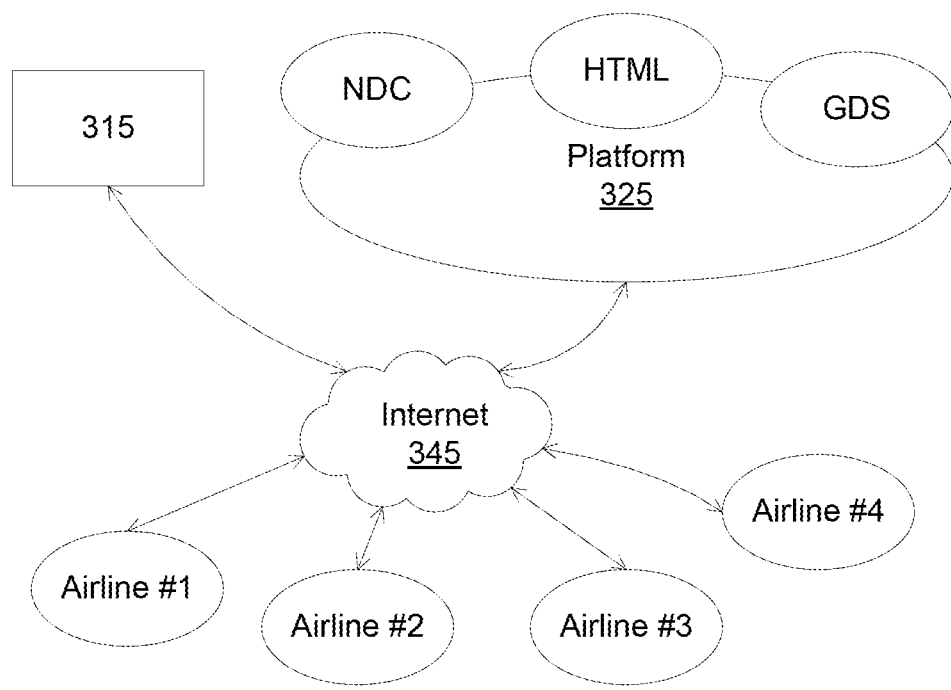

FIGS. 3A and 3B illustrate configurations of travel distribution systems according to some embodiments. In FIG. 3A, a platform 320 can be installed in an inquirer 310 system, such as in a cell phone or a computer of the inquirer. The platform 320 can include instructions or programs to access airlines using NDC standards, to access airlines using GDS, or to access airlines using the internet 340, e.g., through the airline API or websites. After the inquirer 310 issues an inquiry, e.g., a flight request for traveling from a departure to a destination, the platform can use NDC standards, API and/or websites, and GDS network, to contact airlines #1-#4 to get the flight information according to the flight request. The platform can first approach the airlines using NDC standards, followed by approaching airlines using the airline API or websites (in either order, such as using API first followed by using websites or using websites first followed by using API), followed by approaching airlines using GDS. In some embodiments, the databases of all airlines can be searched simultaneously in parallel, e.g., the platform can simultaneously approach the airlines using NDC standards, the airlines using the airline API and web sites, and the airlines using GDS.

In FIG. 3B, a platform 325 can be formed independently, such as in a cloud accessible through the internet. For example, the platform 325 can be installed in a server with connection to the internet 345. An inquirer 315 can access the platform, for example, through the internet. The platform 325 can include instructions or programs to access airlines using NDC standards, to access airlines using GDS, or to access airlines using the internet 345, e.g., through the airline API or websites. After the inquirer 315 issues an inquiry, e.g., a flight request for traveling from a departure to a destination, the platform can use NDC standards, API and/or websites, and GDS network, to contact airlines #1-#4 to get the flight information according to the flight request. The platform can first approach the airlines using NDC standards, followed by approaching airlines using the airline API or websites (in either order, such as using API first followed by using websites or using websites first followed by using API), followed by approaching airlines using GDS. In some embodiments, the databases of all airlines can be searched simultaneously in parallel, e.g., the platform can simultaneously approach the airlines using NDC standards, the airlines using the airline API and websites, and the airlines using GDS.

Figure 4:
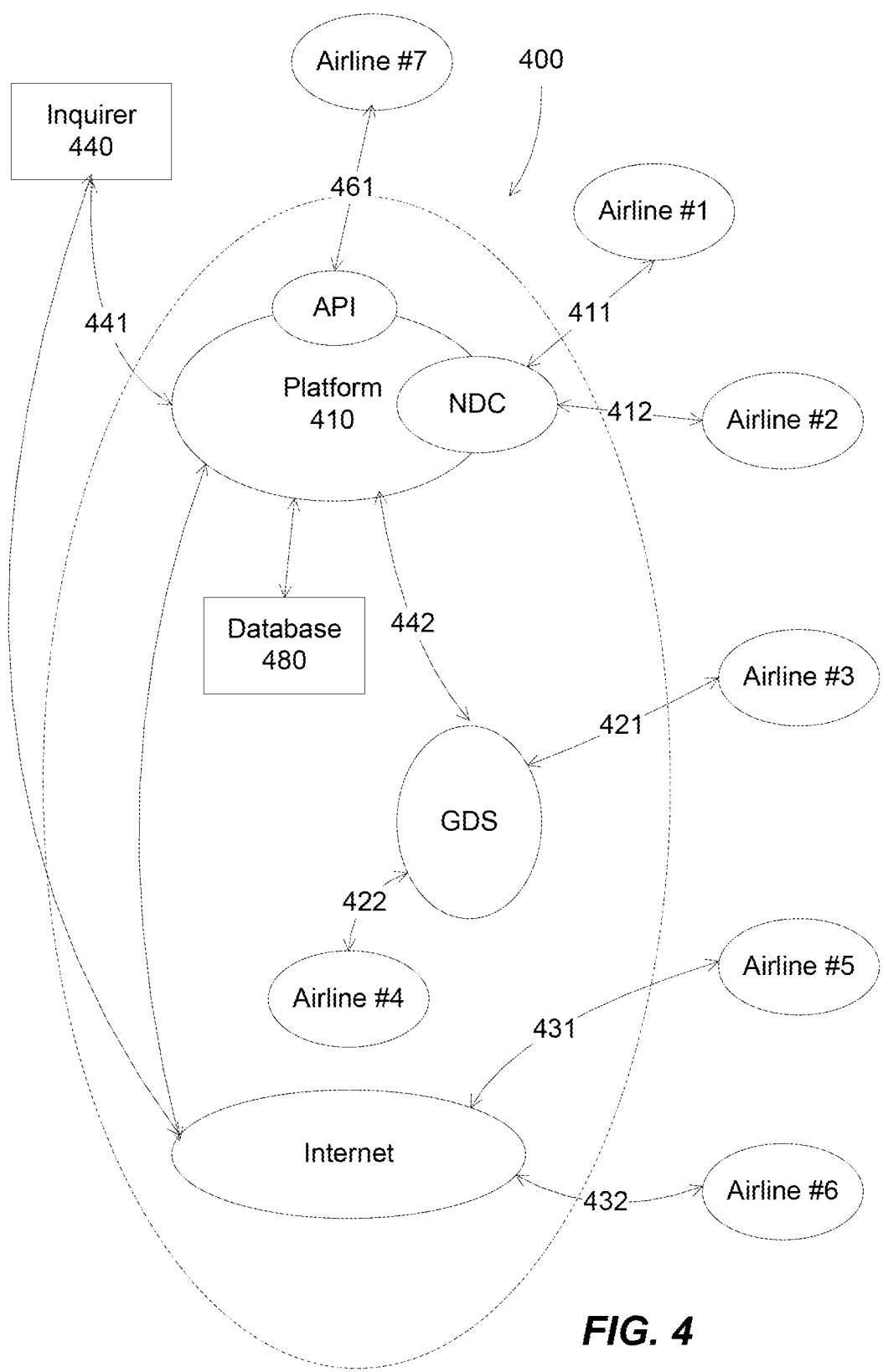
FIG. 4 illustrates a travel distribution system according to some embodiments.

FIG. 4 illustrates a travel distribution system according to some embodiments. A travel distribution system 400 can incorporate NDC, thus can allow a customer or a travel agency to have access to multiple airlines at the same time. The travel distribution system 400 can include a platform 410, which can communicate with different airlines through the NDC protocols, and can create and host a single passenger itinerary record with inputs from multiple suppliers providing services for different parts of the itinerary. With the advanced connections 411 and 412 with the airlines #1 and #2, such as using XML-based data transmission standards, an inquirer 440, such as a customer or a travel agency, can communicate 441 with the platform 410, and can access the rich contents from the airlines, at least similar to the airline websites. In addition, the connection can provide two-way communication, allowing the airlines to respond to individual customers, e.g., formulate an offer that is suited to the customers. The offer can include the prices and other amenities, such as special meals, early checking, etc. The platform 410 can include a database 480. The database can include a copy of the data from the airlines, thus can allow fast access.

The platform 410 can be configured to communicate 442 with a GDS system. Thus the travel distribution system 400 can communicate with airlines #3 and #4, which participate in GDS system, through the connections 421 and 422 with GDS system.

The platform 410 can be configured to communicate 461 with airlines through the airline API. Thus the travel distribution system 400 can communicate with airline #7 through the connections 461 with API configurations.

An inquirer 440 can go through the platform 410 to get information from airlines #1-#4 and #7, e.g., airlines using NDC protocols, airlines participating in GDS system, and airlines having API protocols.

In addition, the travel distribution system 400 can provide the inquirer with access to airlines through the airline websites. Certain airlines offer services through their websites, without being accessible through NDC protocols, GDS system, and/or API information. The travel distribution service 400 can also provide the inquirer with access to these airlines.

The travel distribution system 400 can allow a connection to a network, such as the internet, for example, through a browser interface. For example, an inquirer 440 can communicate with the platform 410 for access to the airlines #1-#4, through NDC protocols and through GDS system. The inquirer 440 can connect to the internet for access to airlines #5 and #6, either directly, e.g., from the inquirer to the internet to the airlines, or through the platform, e.g., from the inquirer to the platform to the internet to the airlines.

In some embodiments, the network connection, e.g., internet browser and internet communication package, can exist in the inquirer system. The inquirer can communicate directly with the airlines #5 and #6 through the built-in network connection.

After accessing the airlines, e.g., airlines #1-#7, the information from the airlines can be consolidated according to the customer preferences. The consolidation can be performed at the platform 410 or at the inquirer 440. For example, the inquirer can access airlines #1-#4 and #7 through the platform, and returning the flight information to the inquirer. The inquirer can access airlines #5-#6 through the network connection to the airline websites, or the airline's App on a mobile device. Information from these airlines can be consolidated, e.g., gathered together and sorted according to the customer preferences, at the inquirer.

Alternatively, the platform can access airlines #1-#4 and #7. The inquirer can access airlines #5-#6 through the network connection to the airline websites, or the airline's App on a mobile device. The inquirer then routes the information from airlines #5 and #6 to the platform. Information from these airlines can be consolidated, e.g., gathered together and sorted according to the customer preferences, at the platform, and then presented to the inquirer.

The above description is shown as examples of a travel distribution system according to some embodiments. Other configurations can also be used, to allow an inquirer, such as a user, a customer or a travel agency, to have access to flight information from airlines, through NDC standards, through airline API and websites, and through a GDS network.

Figure 5:
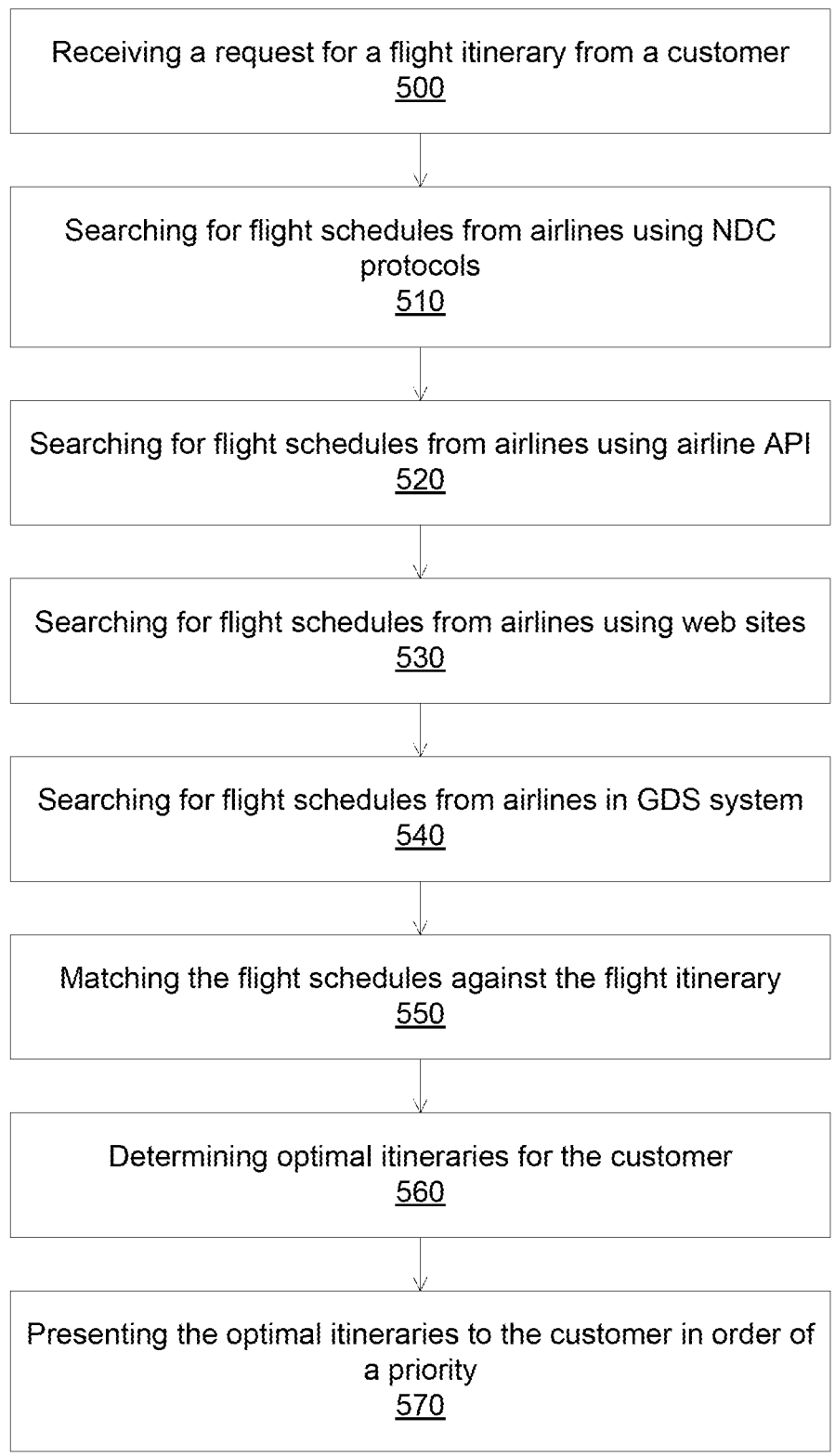
FIG. 5 illustrates a flow chart for obtaining a flight itinerary for a customer according to some embodiments.

FIG. 5 illustrates a flow chart for obtaining a flight itinerary for a customer according to some embodiments. Operation 500 receives a request for a flight itinerary from a customer. The request can be made from a data processing system such as a computer, or from a mobile device. The request can include a date of travel, a departing location, a destination location, and optionally other parameters such as meal restriction or other amenities.

Operation 510 searches for flight characteristics from airlines using NDC protocols. For example, a platform can contact airlines using NDC protocols to search for flight schedules. The platform can request the airlines directly for flight characteristics or search a database which contains flight characteristics of airlines, with the database getting information using NDC protocols for communication.

Operation 520 searches for flight characteristics from airlines using the airlines API. For example, the platform can communicate with the internet, and then search for airline information using the airline API data.

Operation 530 searches for flight characteristics from airlines using web sites or their mobile Apps. For example, an inquirer can communicate with the internet, and then search web sites or mobile Apps of airlines that do not participate in GDS system and do not use NDC protocols.

Operation 540 searches for flight characteristics from airlines in GDS system. For example, the platform can communicate with GDS system, and then search a database of the GDS system which contains flight characteristics of airlines participating in GDS system.

Operation 550 matches the flight characteristics against the flight itinerary. The search can include the departing city, a destination city, and the date of travel. Thus the result of the search can include flight schedules from airlines that travel from the departing city to the destination city on that date.

Operation 560 determines optimal itineraries for the customer. After obtaining the flight characteristics from the airlines, the flight characteristics suitable for the customer can be determined. The matching and the determination can be performed at the platform or at the inquirer.

Operation 570 presents the optimal itineraries to the customer in order of a priority. In some embodiments, an algorithm can be used to remove flight itineraries that are not appropriate. For example, flight itineraries with excessive price, with excessive number of segments, or with excessive layover time can be removed. The remaining flight itineraries can be presented to the customer, in an order of priority. For example, the flight itineraries can be sorted based on price, number of segments (e.g., stops), layover times between segments. The sorted data can be shown to the customer, allowing the customer to select the optimal itinerary. In some embodiments, an algorithm can prioritize the flight itineraries, e.g., the flight itineraries are sorted based on relationships between different factors that the customer has specified.

In some embodiments, the present invention discloses a method for getting a travel itinerary for a customer. The method can include receiving an input from a customer, wherein the input comprises a starting location, an arrival location, and a date of travel from the starting location to the arrival location. The method can further include searching databases of airlines for flights meeting the input, wherein the search uses New Distribution Capability (NDC) data transmission standards for airlines configured to use NDC data transmission standards, wherein the search uses Application Program Interface (API) protocols for airlines configured to offer API protocols, wherein the search uses websites for airlines configured to offer services by websites, wherein the search uses Global Distribution System (GDS) network for airlines configured to participate in GDS network, wherein the order of the search can include searches using NDC standards first, followed by searches using API protocols or websites, and followed by search using GDS network. The method can further include displaying results of the search according to a prioritized scheme.

In some embodiments, the searches can be performed simultaneously in parallel. For example, a search request can be sent for airlines using NDC standards, immediately followed by a search request for airlines using API protocols or websites, and immediately followed by a search request for airlines using GDS network. The search requests can be sent to all airlines using different standards and protocols simultaneously without waiting for any replies.

In some embodiments, the flight search can include searching databases of the airlines, such as searching for individual databases of individual airlines. Further, the search can also collect amenities information from the airlines in addition to flight schedules.

In some embodiments, the method can include a seamless migration from different searches, e.g., from searches using NDC standards to searches using airline API or websites to searches using GDS network. In the past, most, if not all, airlines join GDS network for ticket reservation access. Recently, airlines, such as low cost airlines, have left GDS to start their own distribution system, such as selling through the airline API or websites. Further, NDC standards have been proposed, which attracts airlines to migrate from GDS to NDC.

The present travel distribution system can have access to the different protocols, such as NDC, API, website, and GDS, and therefore can perform a complete search for flight schedules from multiple airlines. In addition, the present travel distribution system can provide a seamless migration to NDC standards, from other protocols such as API, website, and GDS.

In some embodiments, the present travel distribution system can provide a seamless migration from the existing distribution systems such as API, website, and GDS, allowing users of the existing distribution systems to migrate to the present travel distribution system with ease.

In some embodiments, the present invention discloses a travel distribution system that can allow a seamless transition from GDS system and from airlines operating their own websites. The present travel distribution system can include interfaces for communication with GDS system and with airline web sites through the internet. The interfaces can allow the travel distribution system to work with airlines not using NDC protocols and participating in GDS system and to work with airlines not using NDC protocols, not participating in GDS system and maintaining their own web sites.

The travel distribution system can be configured for migrating airlines from GDS system or from web sites to the platform using NDC protocols. Some airlines can decide to utilize NDC protocols, and therefore can be reached by the platform. In some embodiments, the present travel distribution system can perform automatic conversion, e.g., whenever an airline starts accepting NDC protocols, the platform can assign the airline to the list of airlines accessible by NDC protocols.

For example, many airlines participate in GDS system, with some airlines joining the NDC protocols. In the future, some airlines can perceive the benefits of NDC protocols, and can decide to accept communication using NDC protocols. The present travel distribution system can automatically switch to using NDC protocols to communicate with the airline, instead of through the GDS system. Thus the present travel distribution system can provide a seamless transition from GDS to NDC. Eventually, airlines can migrate to platform, and GDS portion can be discontinued.

Some low cost airlines have decided not to join GDS system, for example, due to high cost and/or low benefits. These airlines can operate their own web sites or mobile Apps for travel services. In the future, some airlines can perceive the benefits of NDC protocols, and can decide to accept communication using NDC protocols. The present travel distribution system can automatically switch to using NDC protocols to communicate with the airline, instead of through the internet. Thus the present travel distribution system can provide a seamless transition from web sites to NDC. Eventually, airlines can migrate to platform, and web site and/or mobile App portion can be discontinued.

Figure 6:
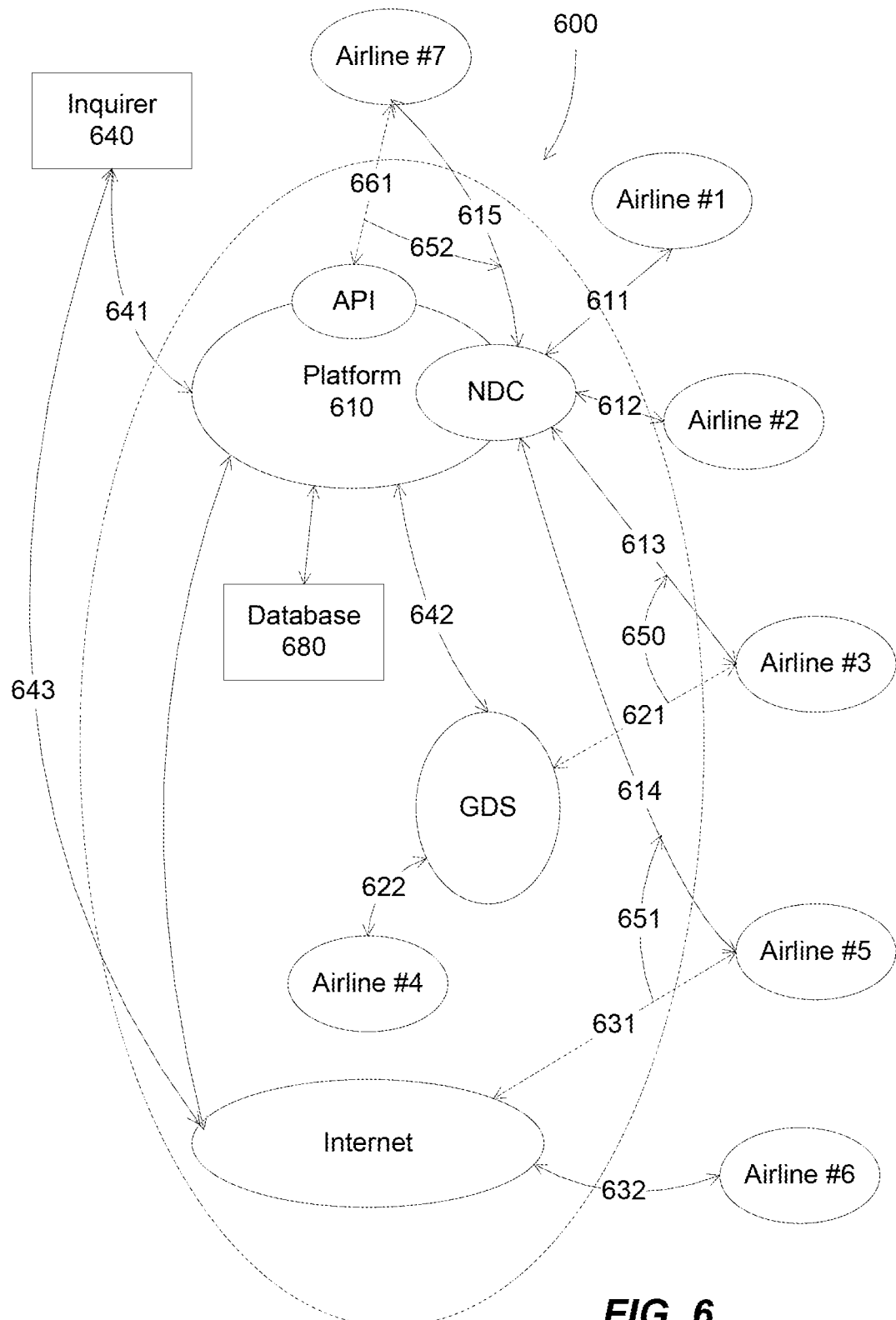
FIG. 6 illustrates a migration configuration for a travel distribution system according to some embodiments.

FIG. 6 illustrates a migration configuration for a travel distribution system according to some embodiments. A travel distribution system 600 can include a platform 610, which can communicate with different airlines through the NDC protocols. The platform 610 can communicate 611 and 612 with airlines #1 and #2. An inquirer 640 can communicate 641 with the platform 610. The platform 610 can include a database 680.

The platform 610 can communicate 642 with the GDS system. Thus the travel distribution system 600 can communicate with airlines #3 and #4, which participate in GDS system, through the connections 621 and 622 with GDS system.

In some embodiments, an airline can migrate to NDC, for example, airline #3 can start communicating using NDC protocols. The travel distribution system 600 can then communicate 613 with the airline #3 through the platform 610 using the NDC protocols. The connection 621 of the airline #3 to the travel distribution system, through the GDS system, can be removed, e.g., information, such as flight schedules and other data, from the airline #3 can be obtained through the platform 610 using NDC protocols. For example, when searching GDS for flight schedules, flight data related to airline #3 can be removed, since this information can be obtained by the platform 610 using NDC protocols.

An inquirer 640 can communicate 643 with airlines #5 and #6, through the internet through connections 631 and 632. The internet connection can include going through the airlines websites, mobile Apps or contacting the airlines through the airline API.

In some embodiments, an airline not participating in GDS system and not using NDC protocols can migrate to NDC, such as airlines allowing connection through the internet. For example, airline #5 can start communicating using NDC protocols. The travel distribution system 600 can then communicate 614 with the airline #5 through the platform 610 using the NDC protocols. The connection 631 of the airline #5 to the travel distribution system, through the internet, can be removed, e.g., information, such as flight schedules and other data, from the airline #5 can be obtained through the platform 610 using NDC protocols. For example, when searching for flight schedules, the search can bypass, e.g., not considering, web site or mobile APP of airline #5, since this information can be obtained by the platform 610 using NDC protocols.

Figure 7:
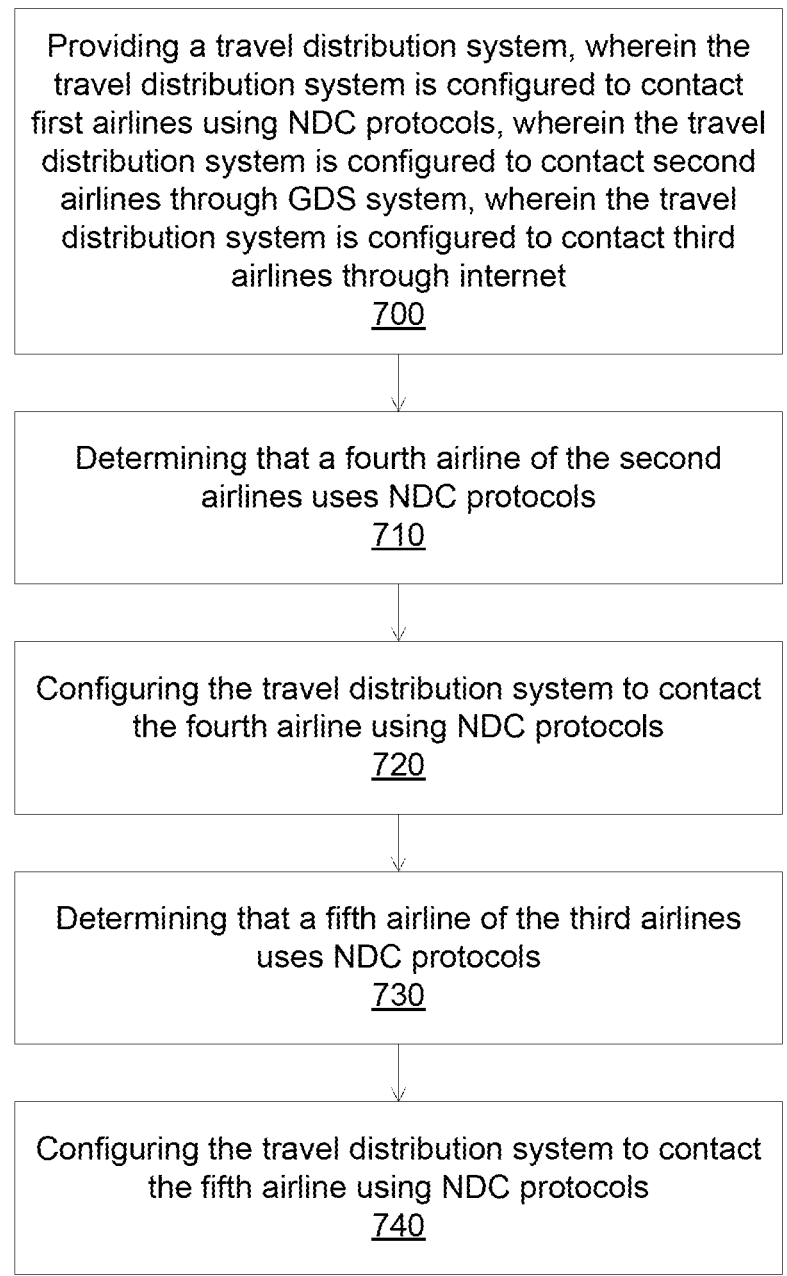
FIG. 7 illustrates a flow chart for migrating airlines according to some embodiments.

FIG. 7 illustrates a flow chart for migrating airlines according to some embodiments. Operation 700 provides a travel distribution system, wherein the travel distribution system is configured to contact first airlines using NDC protocols, wherein the travel distribution system is configured to contact second airlines through GDS system, wherein the travel distribution system is configured to contact third airlines through internet, such as through websites, mobile Apps or API data.

Operation 710 determines that a fourth airline of the second airlines uses NDC protocols, e.g., migrating from GDS to NDC. The determination can be automatic, e.g., the airline activities can be monitored for NDC compliance to recognize the time when the airline announces the switch to NDC protocols.

Operation 720 configures the travel distribution system to contact the fourth airline using NDC protocols. The configuration can be automatic, e.g., the airline is monitored, and automatically configured by the travel distribution system.

Operation 730 determines that a fifth airline of the third airlines uses NDC protocols, e.g., migrating from using airline API or website to NDC. The determination can be automatic, e.g., the airline activities can be monitored for NDC compliance to recognize the time when the airline announces the switch to NDC protocols.

Operation 740 configures the travel distribution system to contact the fifth airline using NDC protocols. The configuration can be automatic, e.g., the airline is monitored, and automatically configured by the travel distribution system.

In some embodiments, the method can maintain a list of airlines. In the list of airlines, there can be a first sub-list of airlines using NDC standards, e.g., the airlines in the first sub-list can be searched using NDC standards. The list of airlines can include a second sub-list, which can contain airlines providing airline API, e.g., the airlines in the second sub-list can be searched using the airline API. The list of airlines can include a third sub-list, which can contain airlines providing airline websites, e.g., the airlines in the third sub-list can be searched using the airline websites. The list of airlines can include a fourth sub-list, which can contain airlines using GDS, e.g., the airlines in the fourth sub-list can be searched using GDS.

In some embodiments, the list of airlines can be configured to specify which airlines to be searched by which protocols, e.g., each airline in the list of airlines can be classified as to be searched using NDC standards, using airline API, using airline website, or using GDS network. For example, the airlines in the list of airlines can be grouped into multiple sub-lists, with the airlines in each sub-list can be searched using a protocol.

In some embodiments, a priority scheme can be included, either in the list of airlines or in a separate element. The priority scheme can specify which protocol can be searched first. For example, a priority scheme can specify that the airlines in the list of airlines are configured to be searched using NDC standards first, before API protocols, websites, or GDS network. Alternatively, the airlines in the list of airlines are configured to be searched using NDC standards first, followed by either using the airline API or the airline websites, and followed by using the GDS network.

In some embodiments, the seamless transition can be performed by updating the list of airlines when a characterization of an airline changes. For example, the list of airlines can be updated to classify an airline as the airline to be searched using NDC standards when the airline is configured to use or start to use NDC data transmission standards, e.g., when the airline is previously configured to be classified as the airline to be searched using the airline API, using the airline website, or using GDS. The list of airlines can be updated to change the search scheme for an airline when the airline migrates from GDS network to NDC standards.

In some embodiments, the method can include obtaining airlines from the list of airlines before performing the search for flights from the airlines.

In some embodiments, the present invention discloses a travel distribution system that is compatible with existing travel distribution systems, such as GDS. The compatibility can ease the transition from the existing distribution system to the present travel distribution system. For example, the present travel distribution system can provide similar graphic user interface and similar functionality as the existing distribution system, such as the GDS. Additional information and functions can be presented, which can be optional or having default values, so that users of existing distribution system can use the present travel distribution system without a learning curve.

In some embodiments, a display profile can be used to determine the display settings for the output of the travel distribution system. The display settings can include different settings, such as a setting for displaying the output according to NDC standards, e.g., having shown flight schedules together with flight amenities. The customer can set the display for displaying the output according to GDS, e.g., showing the flight schedules with or without flight amenities. The display settings can be used to perform gradual transitions, for example, gradually changing from GDS-style display to NDC-style display. For example, an initial display can be a GDS-style display. After a certain time, one feature of NDC-style display can be introduced, which does not disturb the overall feature of the GDS-style display. Additional features can be introduced, for example, after the customer is used to the previous features.

Alternatively, the NDC-style display can incorporate the basic of the GDS-style display, with the features related solely to NDC phased in so that a person familiar with GDS can feel at ease with the NDC-style display.

In some embodiments, the method can include accepting a display profile from the customer for displaying the flights according to the profile. The display profile can determine the settings and features of the display, e.g., the display can be based on the display profile of the customer. The display can be an NDC compatible display, a GDS compatible display, or a transitional from GDS to NDC display, e.g., the display can be compatible with searches using NDC standards, the display can be compatible with searches using GDS network, or the display can be configured to provide a transition from searches using GDS network to searches using NDC standards.

In some embodiments, the present invention discloses a travel distribution system that allows sharing customer information with airlines, including a two-way communication between the airlines and the customers. By letting the airlines know about the customer, such as knowing the preferences of the customers, the airlines can personalize the offer to the customer, a common practice in most Internet retail activities. The sharing information can be tailored so that the customers do not have to surrender their privacy to compare fares or services and amenities. The sharing information can be tailored so that the consumers can benefit by providing the sharing information. Thus buying air travel can be similar to other shopping experiences, such as club members for grocery stores.

For example, depending on the customer's identity, status, history with the airline, business or pleasure traveling, traveling alone or with family, etc., the airlines can generate offers most suited to the consumers, e.g., offers with relative values to the consumers, in addition to price, allowing the consumers to have a meaningful comparison between airline offers.

In some embodiments, the present travel distribution system can be attractive to both travel agencies and end customers. The present travel distribution system can help the travel agents to add value to their clients by allowing for comparisons of product and service options similar to those from multiple airline websites.

In some embodiments, the method can include sharing personal information of the customer with the airlines in exchange for promotion offerings or future promotion offerings from the airlines. The method can include informing the airlines that the customer is interested in promotion offerings or future promotion offerings from the airlines.

In some embodiments, the present invention discloses methods, and programs that can perform the methods, for negotiating with airlines for getting travel itineraries for a consumer. The programs can run on a data processing system, such as a computer or a mobile device such as a cell phone. The methods can include providing customer information to an airline, and negotiating travel plans suitable for the customer from the airlines. The negotiated travel plan can be better suited to the customer than a publicly available travel plan.

In some embodiments, the programs can propose that the airlines offer amenities, such as free lounge access, free upgrade, or free pre-boarding to the customer in exchange for getting a sale. For example, during the time that the airlines need to sell tickets, for example, low sale season or early sale time, the programs can negotiate with the airlines for better travel deals. For example, the programs can request extra amenities for the customer, which can be at no cost or small cost to the airlines.

In some embodiments, the programs can have access to the airline information, such as the fare structure of the airlines, the sale season of the tickets, or in general, the needs of the airlines to sale tickets. Having this information, the programs can create a package for the customer that optimize the sale for both the airlines and the customer.

In some embodiments, the present invention discloses travel scores for customers, which can indicate a worthiness of the customers to the airlines. For example, a customer that travels a lot on business can be valuable to the airlines, since the customer can purchase multiple flight plans, and since the customer travels on business, flight prices is not a serious issue. A customer interested in extra amenities can also be valuable to the airlines, since amenities have marginal incremental cost to the airlines. A matrix and relationship can be used to indicate the worthiness of the customer to the airlines, with a travel score characterizing the customer worthiness. The travel score can be a number, or can be a set of number. The travel score can be used for negotiating with the airlines, since a customer with high travel score can be valuable to the airlines, and the airlines can offer good travel packages for customers with high travel scores.

In some embodiments, a customer can negotiate with an airline to obtain a bargain flight plan. Since the customer has shared his personal information with the airline, the airline can see the customer as a potential revenue generator, such as buying multiple future flight tickets and/or luxury amenities. Thus the airline can offer the customer a deal that is not available for the general public.

For example, a customer can search and find a flight that he is interested in purchasing, e.g., a flight suitable for his travel need, but for a few details, such as a little too high a price or a lacking of an amenity such as no checked bag. The customer can propose to the airline, e.g., through the programs, that he is ready to buy the flight if the airline would agree to his terms, such as a lower price (for example, the customer would buy the flight plan for $100 less than the listed price) and/or having a free checked bag.

In some embodiments, the bargaining can be a legal transaction, e.g., a proposed contract between the customer and the airline. In other words, the customer can change his mind, e.g., canceling the offer to purchase the flight, before the airline agrees to his terms. However, the customer is not free to change his mind after the airline has agreed to sell the ticket according to his terms.

In some embodiments, the customer can put a time limit to his offer, e.g., his offer to buy the flight ticket is only good for a period such as one or two days. The customer can further include a condition that the offer can be subjected to cancellation at any time for any reason before the airline responds.

In some embodiments, the present invention discloses methods, and programs that can perform the methods, for getting travel plans for a consumer. The programs can run on a data processing system, such as a computer or a mobile device like a cell phone. The methods can include getting a desired travel schedule from a customer, generating different travel plans from different airlines, and selecting a travel plan that is most suitable. In some embodiments, the methods can include artificial intelligence and machine learning to deliver optimal value to both the airlines and also to the consumers, which can respond to the consumer requests in real time, creating a package that will be attractive to the specific customer.

In some embodiments, the present invention discloses a method, and a platform to execute the method, that uses artificial intelligence, such as computer algorithm, to find suitable flight itineraries for a customer. The method can include receiving an input from a customer, wherein the input comprises a starting location, an arrival location, and a date of travel from the starting location to the arrival location. The method can further include searching for different flight itineraries meeting the input requirements. The flight itineraries can include flight schedules and flight amenities. The method can further include sorting the searched flights based on a profile of the customer, and displaying a portion of the sorted flights, wherein the portion is best matched to the profile.

In some embodiments, the search for different flight itineraries can include searches using New Distribution Capability (NDC) data transmission standards for airlines configured to use NDC data transmission standards, searches using Application Program Interface (API) protocols for airlines configured to offer API protocols, searches using websites for airlines configured to offer services by websites, and searches using Global Distribution System (GDS) network for airlines configured to participate in GDS network. The order of the search can include searches using NDC standards first, followed by searches using API protocols or websites, and followed by search using GDS network.

In some embodiments, the methods can utilize a travel distribution system that communicates with airlines using NDC protocols, with optionally communicating with airlines participating in GDS system and communicating with airlines through the internet. By using the NDC protocols, the travel distribution system can provide the consumer with travel plans having more information than just simply flight times, flight fares, and seat availabilities, such as information related to the passenger comforts (e.g., more legroom and better entertainment systems due to newer planes) and information related to amenity that the airlines offer (e.g., lounge access, business or first class upgrade). The additional information can assist the customers in selecting the travel plans that are most suitable.

Figure 8:
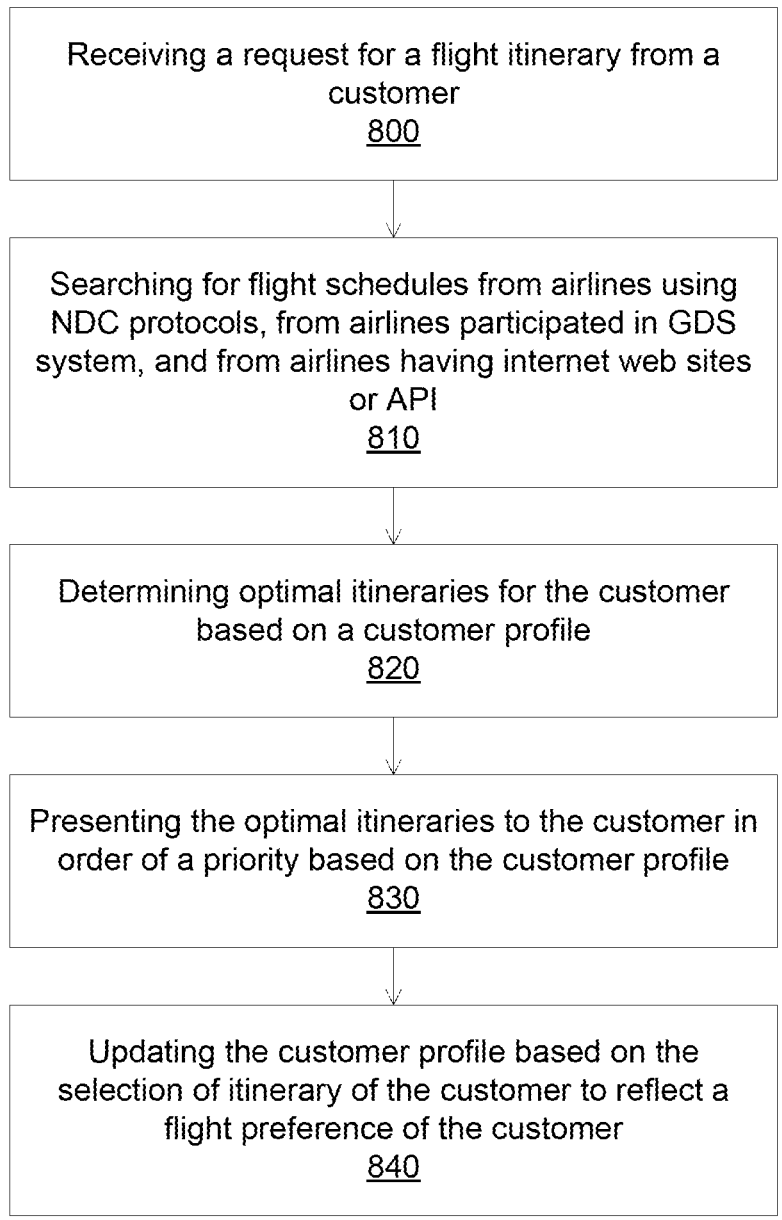
FIG. 8 illustrates a flow chart for obtaining flight itineraries for a customer according to some embodiments.

FIG. 8 illustrates a flow chart for obtaining flight itineraries for a customer according to some embodiments. Operation 800 receives a request for a flight itinerary from a customer. The request can include a starting location, an arrival location, and a date of travel. Operation 810 searches for flight schedules from airlines using NDC protocols, from airlines using web sites, or airline API, and from airlines in GDS system.

Operation 820 determines optimal itineraries for the customer based on a stored customer profile. Operation 830 presents the optimal itineraries to the customer in order of a priority, e.g., based on the customer profile. Operation 840 updates the profile based on the selection of the customer, e.g., the selection of a flight schedule can indicate certain preferences of the customer toward air travel, and these preferences can be captured in the updated profile.

In some embodiments, the methods can include machine intelligence, which can contain algorithms to select travel plans, among the travel plans having the desired destination, that are most suitable for the customers. The algorithm can be based on customer travel profiles, such as travel preference profiles and behavioral profiles. For example, the methods can remove travel plans with layover time longer than 5 hours, or travel plans with excessive fares, e.g., fares higher than certain limits.

In some embodiments, the present invention discloses programs that can perform the machine intelligence methods for selecting travel plans for the customers. The programs can be used in a data processing system such as a computer, or can be used in a mobile system, such as a cell phone, which can communicate with airlines for generating travel plans, and which can perform the machine intelligence algorithms for choosing travel plans for the customers. The programs can communicate with the customers through voice and/or display. For example, a customer can dictate (or type) to the programs to find a travel plan on a certain date to a certain city. The programs can respond by display and/or speech to tell the customer the available travel options.

In some embodiments, the machine intelligence can make decision, e.g., selecting travel plans, based on profiles and inputs from the customer. The profiles and inputs can be collected before, during or after finding the available travel plans. For example, preference travel profiles from the customer can be provided to the programs at a beginning, which can allow the programs to choose appropriate travel plans. For example, the customer can prefer flight schedules convenience over price, and thus long overlay time or uncomfortable travel itineraries can be removed from consideration, even though these travel itineraries might have lower fares. Different preference travel profiles can be used during the search for the travel plans, such as traveling for business (e.g., business profile) or pleasure (personal profile), with or without family members (single or family profile). In addition, inputs from the customer can be provided to the programs after getting available travel plans, such as choosing the best plans among the available plans, or asking the programs to widen the search.

In some embodiments, the profiles and inputs from the customers can assist the programs in selecting travel plans, together with improving the selection process so that ultimately, the programs can present the customer with a travel plan that the customer would approve. The stored information, e.g., the profiles, can be used to narrow the search to appropriate travel plans. The selection of the customer can be used in future search, e.g., the programs can learn from the past experience, for example, by updating the profiles. For example, in the beginning, the programs can offer multiple travel plans, with some plan removed from consideration based on the stored information. Later on, the programs can offer only a few plans, and ultimately, the programs can book and purchase a travel plan for the customer. With the collected data and experience, the programs can be able to choose the travel plan that is most suitable for the customer, e.g., a travel plan that the customer would select, based on the available plans.

In some embodiments, the methods can automatically or semi-automatically select travel plans, including removing travel plans that can be considered unsuitable. The methods can first collect travel plans from different airlines, then remove plans that the customers would not consider, and then present the customers with a small number of travel plans for the customer's final approval.

In some embodiments, the programs can have authority to purchase airfares. For example, the stored information can include credit card information, so that when a travel plan is approved by the customer, the programs can purchase the flight. For multiple selections, the programs can require inputs from the customers before purchasing the flight.

In some embodiments, the programs can include machine intelligence, so that after receiving instruction from the customers, the programs can search for flight information, and based on stored data and past learning experience with the customers, the programs can select a travel plan that is most suitable for the customers. The programs then can purchase the flight, and inform the customers of the flight schedule.

In some embodiments, the programs can search for flight continuously until a good match is found. For example, after getting a request for a travel plan from the customers, the programs can start searching for flight information. The programs can search continuously around the clock, e.g., not just searching one time for flight information. The continuous search can provide better flight selections, for example, better airfare at a certain time and date whenever airlines update or change their fares.

In some embodiments, the programs can take advantages of the changeable fare structure of the airlines to find a good travel plan. For example, the airlines can offer flight cancellation within 24 hours of booking. Thus the programs can search for flight information, and then select the best match for booking. After booking, the programs keep searching. If a better match is found within the 24-hour window, the programs can rebook the better flight, and then cancel the previously booked flight.

In some embodiments, the programs can book a flight, and continuously searching for flights with better matches until the time to pay for the booked flight. If there are not better flights, then the booked flight is purchased. If there is a better flight, then the booked flight is canceled, and the better flight is booked. The process can be repeated until a flight is purchased.

In some embodiments, the programs can search for flight itineraries meeting the customer specification. The programs can then collect other data, such as fare, amenity and comforts. Based on the customer profiles, the programs can choose suitable travel plans for the customers. The suitable plans can be presented to the customers for further selection or approval.

In some embodiments, the profiles can be generated by collecting data and information from the customer, which can be used by the programs to select travel plans. The information can be collected from customer inputs, e.g., in the form of a fill-in questionnaire. The information can include name, birthday, traveling preferences, membership in frequent flyer programs, and income. Other information can also be collected, since the information can be used to make decision in travel plan selection. The use of the information can be explicit. For example, a customer can specify that low fare is the highest priority. Thus travel plans selection can be simplified with fares being the top priority. The use of the information can be implicit. For example, a high income customer would be likely to select comforts over prices, and thus higher fare plan for short layover time (e.g., waiting time between segments of the travel plans) or additional legroom or better customer service can be preferred over lower fare plans.

In some embodiments, the information can be collected from public or private databases, such as credit history and professional association of the customers. The information can be collected from the customer activities, such as from correspondence of the customers, which can indicate a traveling preference of the customers. For example, the customers can send emails, discussing traveling, and indicating that early check-in or boarding can be an important consideration in air traveling. This information can be used to choose travel plans, with priority for airlines offering early checking or boarding.

In some embodiments, the information can be collected from past actions of the customers. For example, even though the customer specifies a preference of comforts over prices, the customer still selects travel plans having lower fare and slightly high discomforts. Thus the past actions of the customer can be a more reliable indication of the customer travel preference, for example, over the answered questionnaires.

Figure 9:
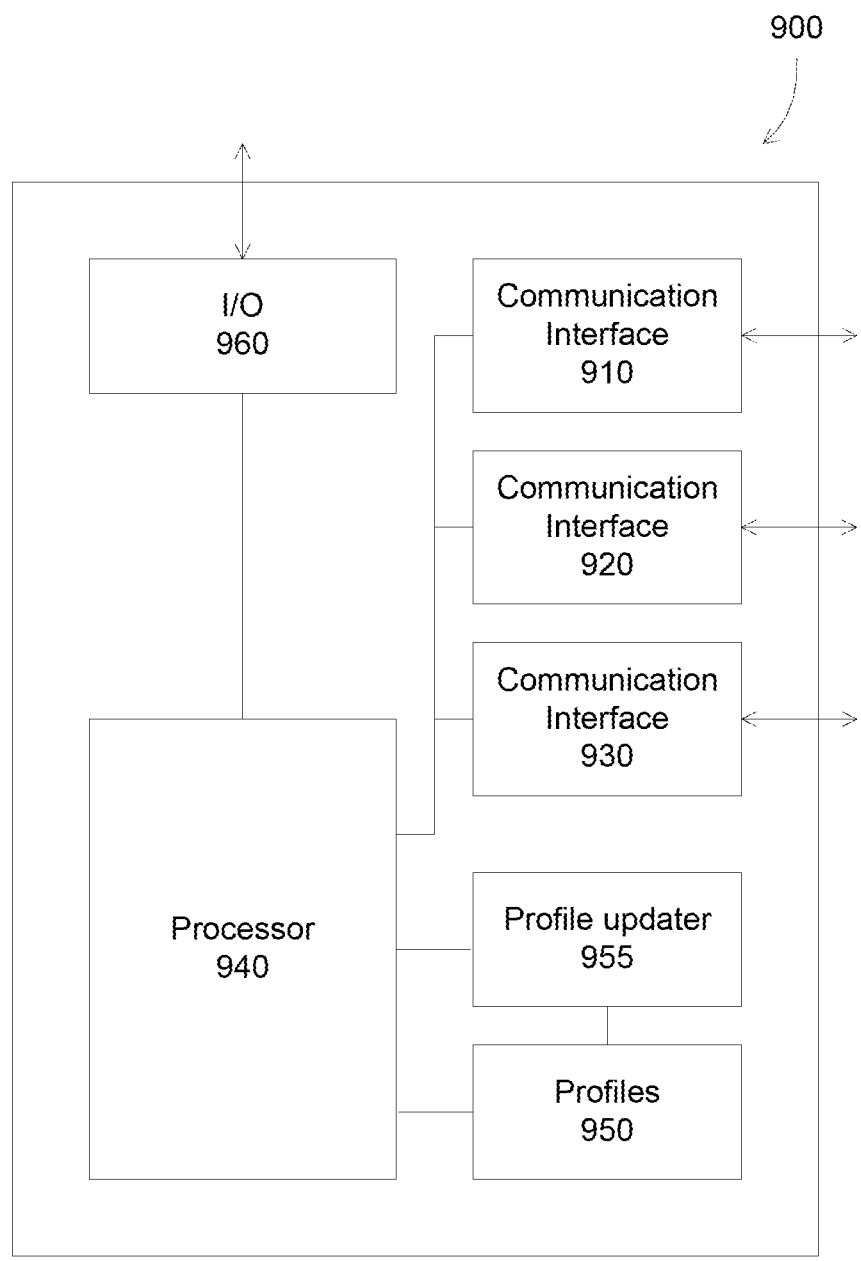
FIG. 9 illustrates a configuration for a device incorporating a travel distribution system according to some embodiments.

FIG. 9 illustrates a configuration for a device incorporating a travel distribution system according to some embodiments. A device 900, such as a computer system or a cell phone, and in general, a desktop or a portable system having a computational capability, can include a processor 940. The processor can communicate, for example, with the customer, through an IO module 960, which can include a display, a speaker, a keyboard, and a microphone. Other components can be included in the IO module to facilitate or to improve customer communication, such as a voice amplifier for the hard-hearing or a Braille system for the blind. The device 900 can be placed in the hand of the customer, such as incorporated in a cell phone or in a computer system for the customer. The device 900 can be placed in the cloud, e.g., at a remote location accessible through a telecommunication system, such as the internet. The customer can use another device to access the device 900.

The device 900 can include communication interfaces, for example, to communicate with airlines or with airline systems for obtaining travel information. The communication interfaces can include an interface 910 for communication with a travel distribution system, which can communicate with airlines using NDC protocols. The communication interfaces can include an interface 920 for communication with a GDS system, which can communicate with airlines participating in GDS system. The communication interfaces can include an interface 930 for communicating with the internet, which can communicate with airlines through the airline web sites or their mobile Apps.

In some embodiments, one communication interface can be used to communicate with two or more airline protocols, such as with NDC and GDS. Alternatively, the communication interfaces can be partially or wholly incorporated in software, which can be loaded to the processor to communicate with the airlines.

The device 900 can include profile module 950 and a profile-updating module 955. The profile module can store profiles of the customers. For personal devices, such as a cell phone, the profile module can store the profiles of a customer, e.g., the owner of the cell phone. There can be multiple profiles for a person, such as a business profile for business traveling, a business companion profile for family member accompanying on business trip, a personal profile for personal traveling, and a family profile for family traveling for leisure.

The device can be configured to run a program that performs a method for getting a travel plan for the customer. For example, the device can get a proposed travel plan from the customer, such as the date and the city pair of travel. The device then can find flight itineraries from airlines, for example, by using the communication interfaces for contacting airlines using NDC protocols, airlines participating in GDS system, and airlines having web sites and API. The device can use the stored profiles to prioritize the flight itineraries, and then present the prioritized flight itineraries to the customer. In the beginning, the device can require inputs from the customer for selecting optimal flight itineraries. The inputs can be used to update the profiles. Thus, after a certain time, the profiles will continue getting more intelligent and the flight itineraries selected by the program based on the profiles can be as good as the flight itineraries that the customer selects himself In some embodiments, the information in the profile can be collected from inputs from the customer, from information in public or private databases, and from past actions of the customer.

In some embodiments, the customer can have different profiles based on different purposes. Thus the programs can select different travel plans based on different profiles specified by the travel purposes of the customers. For example, convenience can have higher priority than fare for business traveling. Traveling with family, especially with young children can have different preferences than traveling alone. Thus the customer flight preferences can be classified into different modes, such as business mode for business traveling, personal mode for leisure traveling, and family mode for traveling with family, either for business or pleasure.

In some embodiments, there can be different preference profiles for a customer, e.g., a customer can have multiple profiles, depending on different travel purposes. For example, a customer can have a preference profile for business travel, another preference profile for personal travel, and another preference profile for family companion travel. There can be different scaling factors for same elements in different profiles. For example, on-time performance of the flight schedule is important in business travel, while price is important in personal travel.

In some embodiments, after a customer is identified, a profile for the customer can be selected for searching flights for the customer. The customer can have one or more stored profiles, and a profile can be selected from a personal profile, a business profile, and a family profile.

In some embodiments, the methods can arrange the searched flight itineraries according to a profile of the customer. For example, a customer can have a first preference of low price, a second preference of online checking, for example for seat selection and for less waiting time at airport counter, and a third preference of less than 6 hour airport layover between flight segments. The method can place the flight itineraries with lower prices first. If there are flights with the same price, then flights with online check in option can be placed first. If the flights all have the online check in option, then flights with less than 6 hour layover is placed first.

Alternatively, the customer preference can be rated, such as having a ranking between 0 and 10. The preference having higher ranking can be selected over the preference with lower ranking, if everything else is the same. For example, a customer preference can have price to be ranked 8, online check in ranked 7, and layover time ranked 5. Then flights with lower prices are placed first, followed by flights with online check in option, followed by flight with low layover time.

In some embodiments, the ranking can be gradual, or relative, e.g., not absolute, such as a ranking of 8 is not absolutely better than a ranking of 7. Each rank number can be worth a value. For example, a price ranked 8 can be better than an online check in ranked 7 for less than about $100 to $200. If a flight does not have online check in and costs about $100 less than a flight with online check in, then the flight with online check in can be placed before the flight with lower price. In other words, a difference of 1 in ranking for price would not be sustained for less than $100 or $200 difference. If a flight does not have online check in and costs about $500 less than a flight with online check in, then the flight with lower price can be placed before the flight with online check in. In other words, a difference of 1 in ranking for price can be enforced for higher than $200 difference in ticket price.

In some embodiments, the methods can classify the searched flight itineraries into multiple groups. The first group can include flights itineraries that are likely to be selected by the customer, such as flights best matched the customer profile. The second group can include flights that are borderline. The third group can include flights that are likely to be rejected by the customer, such as flights poorly matched the customer profile. For example, if price is a preference of the customer, then flights with at least 50% higher price, e.g., over the lowest airfare, can be placed in the second group, and flights with 3× or more higher price can be placed in the third group.

In some embodiments, the profiles or the preference matrix can include multiple elements, each with different important scale. For example, the profile can include preferences of the customer, with the preferences having a rating scale. The profiles can include price, which can be a less important factor when travelling for business as compared to travelling for leisure. The profiles can include schedule convenience, which can be more firm for business travel versus more flexibility for leisure travel. The schedule convenience can include departure time, arrival time, number of flight segments, e.g., number of stops, and layover time between flight segments. The profiles can include other elements, such as maximum number of stops, connections, or flight segments, optimal layover time between flight segments, free checked bags, priority boarding, complimentary upgrades, system wide upgrades, better customer service/dedicated phone lines, discounted/free lounge access, mileage earning bonuses, access to preferred seating ahead of time, waived award fees for tickets, free same-day changes, free or discount on ticket change fees, price hold on booking for a period of time, free/discounted refund or exchange fees, free Wi-Fi, free meals, extra leg room, free entertainment (movies, games etc.).

FIG. 10 illustrates a configuration of a travel profile according to some embodiments. The profile can have a number of elements. Each element of the profiles can have a scaling factor, which indicates the importance of the element for a particular trip. For example, a customer can place high importance to price, thus the price element can have a scaling factor of, for example, 7 out of 10. The customer can travel alone with minimum baggage, thus can place low importance to pre-boarding access or priority boarding, thus the pre-boarding element can have scaling factor of, for example, 2 out of 10. The scaling factor can be a function, instead of a number. For example, a layover time of 2 hours can be considered optimal, and can have a scaling factor of 8. A layover time of 6 or more hours can be considered undesirable, and thus can have a scaling factor of 1. The profiles can be used to rank the different available travel plans, and the travel plans having high ranks can be selected for the customer review, or for purchasing the flight. The scaling factor can be a function of airlines, e.g., the customer can have different preferences for different airlines. For example, a customer may not want American Airlines to offer a lounge at the airport because the customer already has a yearly lounge pass with American Airlines. A customer may or may not want United Airlines to offer a lounge at the airport because the customer already has a yearly lounge pass with American Airlines. For example, if the United Airlines lounge is closer to a departing gate as compared to the American Airlines lounge, the customer might be interested in obtaining the United Airlines lounge pass.

In some embodiments, the profiles can be updated, e.g., the programs can ask the customers for additional data, e.g., beyond the stored data and information that the customers have supplied, to make decision of travel plan selection. The programs can ask the customers for selecting plans, among different plans. The selection of the customers can be used to improve the programs. For example, the programs can have a machine-learning module, which can learn from past actions of the customers, such as the selection of travel plans that the programs present to the customers. The programs can provide travel plans with different characteristics, such as one having low fare/low comfort and one having high fare/high comfort. Based on the selection of the customers, a preference matrix can be established, formulating a preference relationship between price and comfort.

In some embodiments, the present invention discloses behavioral profiles for customer travels. The profiles can be dynamically developed, e.g., the profiles can be updated with the customer behavior and actions. For example, an initial profile can be provided, using inputs from the customer. The initial profiles can include information similar to that given to a human travel agent. For example, the initial profiles can include a preference of the customer regarding seat selection, e.g., aisle or window seat.

The profiles can be dynamically enhanced, for example, with data input from the client's purchase history and behavior in making choices from the travel offerings that are presented to him/her. The profiles can also be dynamically enhanced with data collected on the client from social media and the World Wide Web. The dynamic enhancement can help refine the behavioral predictability and help the programs making decisions that mirror the client's own behavior.

Figure 11:
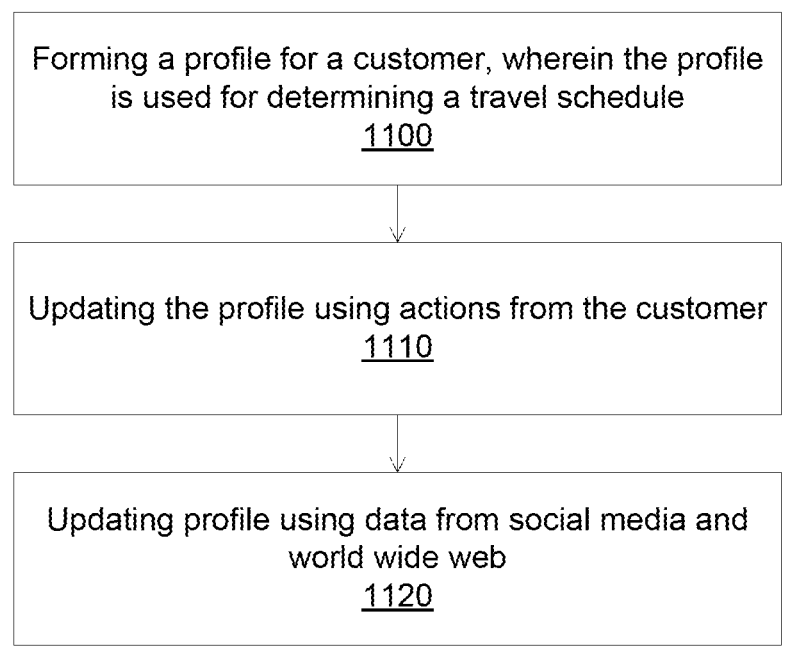
FIG. 11 illustrates a flow chart for a dynamic development of profiles according to some embodiments.

FIG. 11 illustrates a flow chart for a dynamic development of profiles according to some embodiments. Operation 1100 forms a profile for a customer, wherein the profile is used for determining a travel schedule. The profiles can be formed by a number of questions and answers, such as the preferences of the customer with respect to travel. Operation 1110 updates the profile using actions from the customer. For example, the customer can select a flight schedule among a number of flight schedules. The preferences of the selected flight schedule can be used to update the customer profiles. Operation 1120 updates profile using data from social media and the World Wide Web, for example, the customer can post personal data and preferences on professional network or on social media. The preferences can be used to update the customer profiles.

In some embodiments, the profile can be updated based on an action of the customer. For example, the profile can be updated when the customer unselects a flight or selects a flight, e.g., the characteristics of the selected or removed flights can be translated into the profile features, so that future selection of flights can be more accurate.

In some embodiments, the customer can be trained to update the profile. Flight selection can be shown, together with reasons for acceptance or for rejection. Inputs from the customer can be used for update the profile.

In some embodiments, a flight itinerary can be shown, with all the detail characteristics, such as flight schedule and flight amenities. The customer can provide input regarding the flight, such as too high a price or too long a layover time, there is no online check in, etc. The customer input can be used to update the profile.

For example, a searched flight can be shown that is characterized to be removed from consideration due to not matching the current profile. Reasons for the flight to be removed can also be shown, such as too high a price, too long a layover time, no online check-in, etc. The customer can confirm or reject the reasons. The customer can agree with the recommendation to remove the flight, or the customer can reject the recommendation. The input of the customer can be used to update the profile.

A searched flight can be shown that is selected due to best matching the current profile. Reasons for the flight to be selected can also be shown, such as good price, reasonable layover time, there is online check in, etc. The customer can confirm or reject the reasons. The customer can agree with the recommendation to select the flight, or the customer can reject the recommendation. The input of the customer can be used to update the profile.

After getting flight schedules from each airline, the programs can match the flight schedules against the flight request. The programs can determine which flight schedules are the optimal itineraries for the customer needs based on the profiles that the programs have built on the client's behavior. The optimal itineraries can then be presented to the customer, in order of priority.

In some embodiments, provided is a machine-readable storage, having stored there on a computer program having a plurality of code sections for causing a machine to perform the various steps and/or implement the components and/or structures disclosed herein. In some embodiments, the present invention may also be embodied in a machine or computer readable format, e.g., an appropriately programmed computer, a software program written in any of a variety of programming languages. The software program would be written to carry out various functional operations of the present invention. Moreover, a machine or computer readable format of the present invention may be embodied in a variety of program storage devices, such as a diskette, a hard disk, a CD, a DVD, a nonvolatile electronic memory, or the like. The software program may be run on a variety of devices, e.g. a processor.

In some embodiments, the methods can be realized in hardware, software, or a combination of hardware and software. The methods can be realized in a centralized fashion in a data processing system, such as a computer system or in a distributed fashion where different elements are spread across several interconnected computer systems. Any kind of computer system or other apparatus adapted for carrying out the methods described herein can be used. A typical combination of hardware and software can be a general-purpose computer system with a computer program that can control the computer system so that the computer system can perform the methods. The methods also can be embedded in a computer program product, which includes the features allowing the implementation of the methods, and which when loaded in a computer system, can perform the methods.

The terms "computer program", "software", "application", variants and/or combinations thereof, in the context of the present specification, mean any expression, in any language, code or notation, of a set of instructions intended to cause a system having an information processing capability to perform a particular function either directly or indirectly. The functions can include a conversion to another language, code or notation, or a reproduction in a different material form. For example, a computer program can include a subroutine, a function, a procedure, an object method, an object implementation, an executable application, an applet, a servlet, a source code, an object code, a shared library/dynamic load library and/or other sequence of instructions designed for execution on a data processing system, such as a computer.

In some embodiments, the methods can be implemented using a data processing system, such as a general purpose computer system. A general purpose computer system can include a graphical display monitor with a graphics screen for the display of graphical and textual information, a keyboard for textual entry of information, a mouse for the entry of graphical data, and a computer processor. In some embodiments, the computer processor can contain program code to implement the methods. Other devices, such as a light pen (not shown), can be substituted for the mouse. This general purpose computer may be one of the many types well known in the art, such as a mainframe computer, a minicomputer, a workstation, or a personal computer.

Figure 12:
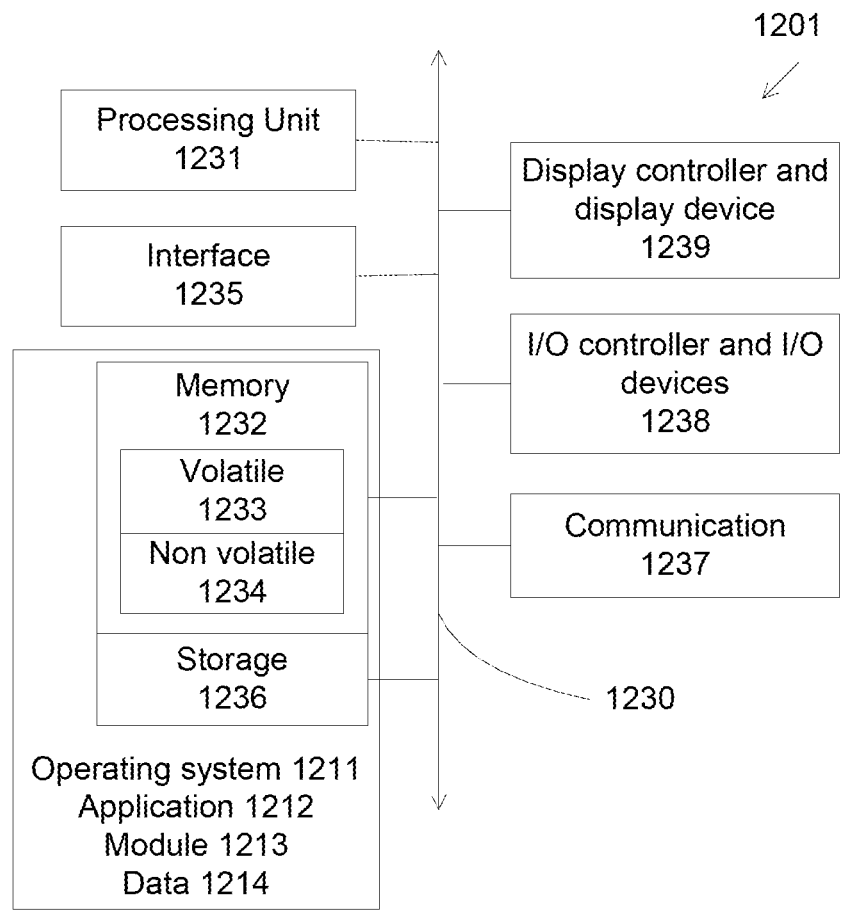
FIG. 12 illustrates a computing environment according to some embodiments.

FIG. 12 illustrates a computing environment according to some embodiments. An exemplary environment for implementing various aspects of the invention includes a computer 1201, comprising a processing unit 1231, a system memory 1232, and a system bus 1230. The processing unit 1231 can be any of various available processors, such as single microprocessor, dual microprocessors or other multi-processor architectures. The system bus 1230 can be any type of bus structures or architectures, such as 12-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), or Small Computer Systems Interface (SCSI).

The system memory 1232 can include volatile memory 1233 and nonvolatile memory 1234. Nonvolatile memory 1234 can include read only memory (ROM), programmable ROM (PROM), electrically programmable ROM (EPROM), electrically erasable PROM (EEPROM), or flash memory. Volatile memory 1233, can include random access memory (RAM), synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), or direct Rambus RAM (DRRAM).

Computer 1201 also includes storage media 1236, such as removable/nonremovable, volatile/nonvolatile disk storage, magnetic disk drive, floppy disk drive, tape drive, Jaz drive, Zip drive, LS-100 drive, flash memory card, memory stick, optical disk drive such as a compact disk ROM device (CD-ROM), CD recordable drive (CD-R Drive), CD rewritable drive (CD-RW Drive) or a digital versatile disk ROM drive (DVD-ROM). A removable or non-removable interface 1235 can be used to facilitate connection. These storage devices can be considered as part of the I/O device 1238 or at least they can be connected via the bus 1230. Storage devices that are "on board" generally include EEPROM used to store the BIOS.

The computer system 1201 further can include software to operate in the environment, such as an operating system 1211, system applications 1212, program modules 1213 and program data 1214, which are stored either in system memory 1232 or on disk storage 1236. Various operating systems or combinations of operating systems can be used.

Input devices can be used to enter commands or data, and can include a pointing device such as a mouse, trackball, stylus, touch pad, keyboard, microphone, joystick, game pad, satellite dish, scanner, TV tuner card, sound card, digital camera, digital video camera, web camera, and the like, connected through interface ports 1238. Interface ports 1238 can include a serial port, a parallel port, a game port, a universal serial bus (USB), and a 1394 bus. The interface ports 1238 can also accommodate output devices. For example, a USB port may be used to provide input to computer 1201 and to output information from computer 1201 to an output device. Output adapter 1239, such as video or sound cards, is provided to connect to some output devices such as monitors, speakers, and printers.

Computer 1201 can operate in a networked environment with remote computers. The remote computers, including a memory storage device, can be a personal computer, a server, a router, a network PC, a workstation, a microprocessor based appliance, a peer device or other common network node and the like, and typically includes many or all of the elements described relative to computer 1201. Remote computers can be connected to computer 1201 through a network interface 1235 and communication connection 1237, with wire or wireless connections. Network interface 1235 can be communication networks such as local-area networks (LAN), wide area networks (WAN) or wireless connection networks. LAN technologies include Fiber Distributed Data Interface (FDDI), Copper Distributed Data Interface (CDDI), Ethernet/IEEE 1202.3, Token Ring/IEEE 1202.5 and the like. WAN technologies include, but are not limited to, point-to-point links, circuit switching networks like Integrated Services Digital Networks (ISDN) and variations thereon, packet switching networks, and Digital Subscriber Lines (DSL).

Figure 13:
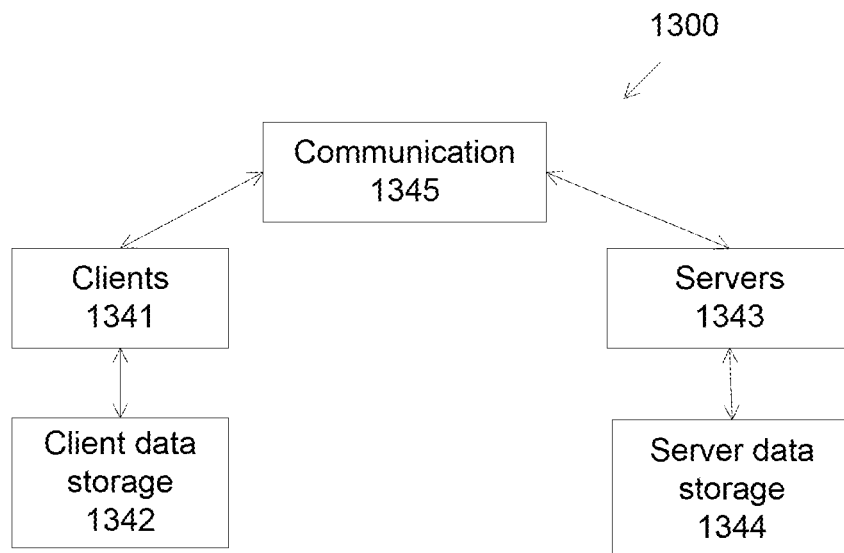
FIG. 13 is a schematic block diagram of a sample computing environment with which the present invention can interact.

FIG. 13 is a schematic block diagram of a sample computing environment with which the present invention can interact. The system 1300 includes a plurality of client systems 1341. The system 1300 also includes a plurality of servers 1343. The servers 1343 can be used to employ the present invention. The system 1340 includes a communication network 1345 to facilitate communications between the clients 1341 and the servers 1343. Client data storage 1342, connected to client system 1341, can store information locally. Similarly, the server 1343 can include server data storages 1344.

Having thus described certain preferred embodiments of the present invention, it is to be understood that the invention defined by the appended claims is not to be limited by particular details set forth in the above description, as many apparent variations thereof are possible without departing from the spirit or scope thereof as hereinafter claimed.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
receiving an input from a customer, wherein the input comprises a starting location, an arrival location, and a date of travel from the starting location to the arrival location;
searching databases containing flight information for flights meeting the input,
wherein the search uses a search scheme on a list of airlines,
wherein the airlines in the list of airlines are listed as using New Distribution Capability (NDC) data transmission standards, or at least one of listed as offering Application Program Interface (API) protocols, listed as offering services by websites, or listed as participating in Global Distribution System (GDS) network,
wherein the list of airlines is configured to be updated when an airline in the list of airlines migrates to the NDC data transmission standards, and
wherein the search scheme comprises:
searching using NDC data transmission standards for airlines listed as using NDC data transmission standards, and
searching, by at least one of: (1) using Application Program Interface (API) protocols for airlines listed as offering API protocols, (2) using Global Distribution System (GDS) network protocols for airlines listed as participating in GDS network, (3) searching websites for airlines listed as offering services by websites, or (4) any combination thereof; and
presenting to the customer the results of the search according to a prioritized scheme.

2. The method of claim 1, wherein the airlines configured to be searched using NDC data transmission standards are configured to be searched only using NDC data transmission standards or also configured to be searched using at least one of API protocols, websites, or GDS network.

3. The method of claim 1, wherein some airlines in the list of airlines are classified as to be searched using NDC data transmission standards.

4. The method of claim 1, wherein searching using NDC data transmission standards for airlines configured to be searched using NDC data transmission standards comprising searching one or more databases of the airlines using NDC data transmission standards.

5. The method of claim 1, wherein searching using API protocols for airlines configured to be searched using API protocols comprising searching one or more databases of the airlines using API protocols, and wherein searching using GDS network for airlines configured to participate in GDS network comprising searching one or more databases of the GDS network.

6. The method of claim 1, wherein searching websites for airlines configured to offer services by websites comprising searching one or more websites of the airlines offering services by websites.

7. The method of claim 1, further comprising:
obtaining searched protocols of airlines from the list of airlines before performing the search for flights from the airlines,
wherein the searched protocols comprise at least one of protocols for NDC standards, protocols for airline API, protocols for airline website, or protocols for GDS network.

8. The method of claim 1, wherein the list of airlines is configured to be automatically updated when an airline in the list of airlines migrates to the NDC data transmission standards.

9. A method comprising:
maintaining a list of airlines, wherein the airlines in the list of airlines are listed as using New Distribution Capability (NDC) data transmission standards, or at least one of listed as offering API protocols, listed as offering services by websites, or listed as participating in Global Distribution System (GDS) network,
wherein the list of airlines is used in a search for a flight itinerary, and
wherein the search comprises:
searching using NDC data transmission standards for airlines listed as using NDC data transmission standards, and
searching, by at least one of: (1) using at least one of Application Program Interface (API) protocols for airlines listed as offering API protocols, or using Global Distribution System (GDS) network protocols for airlines listed as participating in GDS network, or (2) searching websites for airlines listed as offering services by websites; and
updating the list of airlines when an airline migrates to NDC data transmission standards.

10. The method of claim 9, wherein:
searching using NDC data transmission standards for airlines configured to be searched using NDC data transmission standards comprising searching one or more databases of the airlines using NDC data transmission standards;
searching using API protocols for airlines configured to be searched using API protocols comprising searching one or more databases of the airlines using API protocols;
searching using GDS network for airlines configured to participate in GDS network comprising searching one or more databases of the GDS network; and
searching websites for airlines configured to offer services by websites comprising searching one or more websites of the airlines offering services by websites.

11. The method of claim 9, further comprising:
obtaining searched protocols from airlines from the list of airlines before performing the search for flights from the airlines,
wherein the searched protocols comprise at least one of protocols for NDC standards, protocols for airline API, protocols for airline website, or protocols for GDS network.

12. The method of claim 9, further comprising
receiving an input from a customer;
searching databases containing flight information for flights meeting the input using the search.

13. The method of claim 12, further comprising
selecting a profile of the customer,
sorting the flights meeting the input based on the profile.

14. The method of claim 9, wherein the list of airlines is configured to be automatically updated when an airline in the list of airlines migrates to the NDC data transmission standards.

15. A method comprising:
receiving an input, wherein the input comprises a starting location, an arrival location, and a date of travel from the starting location to the arrival location;
searching databases containing flight information for flights meeting the input,
wherein the search uses a search scheme on a list of airlines,
wherein the airlines in the list of airlines are specified to be searched using New Distribution Capability (NDC) data transmission standards, using Application Program Interface (API) protocols, using website protocols, or through using Global Distribution System (GDS) network protocols,
wherein, based on specified protocols of the airlines in the list of airlines, the search scheme comprises:
searching using NDC data transmission standards for airlines configured specified to be searched using NDC data transmission standards,
searching using Application Program Interface (API) protocols for airlines configured specified to be searched using API protocols,
searching through Global Distribution System (GDS) network for airlines participating in specified to be searched using GDS network protocols, or
searching websites for airlines offering services by websites
specified to be searched using website protocols; and presenting the results of the search.

16. The method of claim 15, wherein searching using NDC data transmission standards for airlines configured to be searched using NDC data transmission standards comprising searching one or more databases of the airlines using NDC data transmission standards.

17. The method of claim 15, wherein searching using API protocols for airlines configured to be searched using API protocols comprising searching one or more databases of the airlines using API protocols, and wherein searching using GDS network for airlines configured to participate in GDS network comprising searching one or more databases of the GDS network.

18. The method of claim 15, wherein searching websites for airlines configured to offer services by websites comprising searching one or more websites of the airlines offering services by websites.

19. The method of claim 15, further comprising:
obtaining the specified protocols of airlines from the list of airlines before performing the search for flights from the airlines,
wherein the specified protocols comprise at least one of protocols for NDC standards, protocols for airline API, protocols for airline website, or protocols for GDS network.

20. The method of claim 15, wherein the list of airlines is configured to be automatically updated when an airline in the list of airlines migrates to the NDC data transmission standards.

* * * * *